US011288010B2

(12) United States Patent
Chen et al.

(10) Patent No.: US 11,288,010 B2
(45) Date of Patent: Mar. 29, 2022

(54) EFFICIENTLY STORING COMPUTER PROCESSOR DATA STRUCTURES IN COMPUTER MEMORY

(71) Applicant: INTEL CORPORATION, Santa Clara, CA (US)

(72) Inventors: Zhi Yong Chen, Shanghai (CN); Zhiqiang Qin, Shanghai (CN); Xueyan Wang, Lacey, WA (US); Fang Yuan, Shanghai (CN)

(73) Assignee: INTEL CORPORATION, Santa Clara, CA (US)

(*) Notice: Subject to any disclaimer, the term of this patent is extended or adjusted under 35 U.S.C. 154(b) by 45 days.

(21) Appl. No.: 16/638,694

(22) PCT Filed: Sep. 25, 2017

(86) PCT No.: PCT/CN2017/103151
§ 371 (c)(1),
(2) Date: Feb. 12, 2020

(87) PCT Pub. No.: WO2019/056358
PCT Pub. Date: Mar. 28, 2019

(65) Prior Publication Data
US 2020/0218471 A1   Jul. 9, 2020

(51) Int. Cl.
*G06F 3/06*   (2006.01)
(52) U.S. Cl.
CPC .......... *G06F 3/0659* (2013.01); *G06F 3/0604* (2013.01); *G06F 3/0631* (2013.01); *G06F 3/0673* (2013.01)

(58) Field of Classification Search
CPC .... G06F 3/0659; G06F 3/0604; G06F 3/0631; G06F 3/0673; G06F 12/0895; G06F 12/084
See application file for complete search history.

(56) References Cited

U.S. PATENT DOCUMENTS 9,535,847 B2 * 1/2017 Henry ................. G06F 1/24
10,409,723 B2 * 9/2019 Ma .................. G06F 12/084
(Continued)

OTHER PUBLICATIONS

International Search Report and Written Opinion for the International Patent Application No. PCT/CN2017/103151, dated Jun. 27, 2018, 7 pages.

*Primary Examiner* — Charles Rones
*Assistant Examiner* — Tong B. Vo
(74) *Attorney, Agent, or Firm* — Kacvinsky Daisak Bluni PLLC

(57) ABSTRACT

Logic may store data structures for two or more processors in memory such as cache, system management memory, protected memory, or other memory. Logic may compress the data structures to be stored in the memory. Logic may determine a reference data structure, store the reference data structure in the memory, determine a difference between a data structure for a second processor and the reference data structure, and store the difference in the memory. Logic may store the difference in the memory within a data structure such as a linked list or a bitmap. Logic may decompress the difference by combining the difference with the reference data structure. Logic may expand the useable data region to include cache in the two or more processors. Logic may instruct two or more processors to store their processor data structures in their respective caches and perform initialization with the processor data structures.

24 Claims, 10 Drawing Sheets

(56) References Cited

U.S. PATENT DOCUMENTS

| | | | |
|---|---|---|---|
| 2006/0080398 A1* | 4/2006 | Hoover | G06F 12/084 |
| | | | 709/213 |
| 2009/0019228 A1* | 1/2009 | Brown | G06F 12/0895 |
| | | | 711/135 |
| 2012/0137059 A1* | 5/2012 | Yang | G06F 3/0659 |
| | | | 711/104 |
| 2014/0195499 A1 | 7/2014 | Amit et al. | |
| 2014/0281457 A1* | 9/2014 | Weissmann | G06F 9/45558 |
| | | | 713/2 |
| 2014/0325163 A1 | 10/2014 | Arndt | |
| 2014/0359225 A1* | 12/2014 | Lee | G06F 12/084 |
| | | | 711/130 |
| 2015/0010143 A1* | 1/2015 | Yang | H04L 9/3249 |
| | | | 380/28 |
| 2015/0067214 A1* | 3/2015 | Henry | G06F 9/4418 |
| | | | 710/261 |
| 2015/0248367 A1* | 9/2015 | Tucek | G06F 16/172 |
| | | | 710/308 |
| 2016/0117249 A1 | 4/2016 | Lin et al. | |
| 2016/0344759 A1 | 11/2016 | Zak et al. | |
| 2017/0097792 A1* | 4/2017 | Carter | G06F 3/064 |
| 2019/0080082 A1* | 3/2019 | Desai | G06F 21/52 |

\* cited by examiner

| | MTRRs | | | | SYSTEM ADDRESS MAP |
|---|---|---|---|---|---|
| | CPU0 | CPU1 | CPU2 | ... | CPU(n) | |
| | 0xFFFF FFFF | 0xFFFF FFFF | 0xFFFF FFFF | ... | 0xFFFF FFFF | 4G |
| | CodeRegion = 3MB | CodeRegion = 3MB | CodeRegion = 3MB | ... | CodeRegion = 3MB | Cache as RAM (CAR) CodeRegion ← 1310 |
| | 0xFFD0 -0000 | 0xFFD0 -0000 | 0xFFD0 -0000 | ... | 0xFFD0 -0000 | |
| | | | | | | |
| | 0xFE9F FFFF | 0xFE7F FFFF | 0xFE5F FFFF | ... | **0xFE9F FFFF-sktID*2MB** | DATA REGION |
| 1322 → | DATASTACK =2MB | DATASTACK =2MB | DATASTACK =2MB | ... | DATASTACK =2MB | Cache as RAM (CAR) DataStack ← 1320 |
| 1324 → | 0xFE8 0000 | 0xFE6 0000 | 0xFE4 0000 | ... | **0xFE8 0000-sktID*2MB** | |
| | ... | ... | ... | ... | ... | ... |
| | 0x0000 0000 | 0x0000 0000 | 0x0000 0000 | | 0x0000 0000 | 0G |

FIG. 1D

Compression function:
1) x=0; pointer=0.
2) load CPU(0) into Frame(0), pointer = size of (Frame data struct);
3) FOR LOOP CPU (x=1; CPU(x) not empty in CPU-list; x=x+1)
4) Read the data from CPU(x), transaction and save to Frame(x)
5) Calculate the Frame Delta x = Frame (x) – Frame (x-1),
6) Save the non-zero data only as delta (x), in a much smaller size
7) (The algorithm can be as simple as possible, a link-list of {data, location} or bitmap)
8) copy delta (x) to pointer with size of (delta (x))
9) pointer = pointer + size of delta (x)
10) END LOOP

FIG. 4A

Decompression function:
1) x=0; frame pointer = the first address of the data structure;
2) CPU (0) data struct = copy data from frame_pointer, size of (Frame);
3) FOR LOOP (x=1; frame(x) not empty in the data structure; x=x+1)
4) frame(x) = delta (x) {the compressed data of Frame Delta (x)}
5) Decompress delta (x) from the {data, location} to the Frame Delta (x)
6) Frame (x) = Frame (x-1) + Frame Delta (x)
7) CPU (x) = Frame (x);
8) Transaction with the CPU (x) data, Read or Write to CPU Registers , etc.
9) END LOOP

Compression function for Dynamic Frames:
1) x=0;
2) Ref_Frame = ALLOCATE of a new Frame, size of(Frame data struct)
3) load CPU(0) all data into Ref_Frame(0);
4) temp_Frame = ALLOCATE new Frame size of(Frame);
5) Read the Pcd of NumberOfCPU and allocate an array of frames_pointer[ ]=NULL;
6) LOOP WHILE (CPU(x) not empty in the system CPU-list)
7) Read the data from CPU(x) and save to temp_Frame
8) Frame Delta (x) = temp_Frame − Ref_Frame
9) Save the non-zero data only, compressed to delta (x) {smaller size than Delta(x)}
10) frames_pointer(x) = ALLOCATE a new frame, size of the compressed size of delta(x)
{The intra-frame compression algorithm can be a simple link-list, or JPEG algorithm}
11) Copy compressed data of delta(x) to frames_pointer(x)
12) x = x+1;
13) END LOOP
14) FREE temp_Frame

FIG. 4D

Decompression function for Dynamic Frames:
1) x=0;
2) Ref_Frame = the first Frame of the data structure;
3) temp_Frame = ALLOCATE new Frame (Frame data struct);
4) Read the Pcd of NumberOfCPU; get the array of frames_pointer[];
{Pcd = Number of pointers in the array of frames_pointer[]}
5) LOOP WHILE (x < Pcd.NumberOfCPU)
6) IF (frames_pointer[x] <> NULL) THEN
7) Read the frame(x) in delta(x), and decompress the data to Frame Delta (x)
8) temp_Frame = Ref_Frame + Frame Delta (x);
9) CPU(x) = temp_Frame (x);
10) update the CPU(x) with updated data, updated to CPU(x');
11) IF (CPU(x') EQU CPU(x)) CONTINUE; {//no need to reallocate buffer;}
12) FREE frames_pointer[x] data structure; frames_pointer[x]=NULL;
13) ENDIF
14) Frame Delta (x') = CPU(x') − Ref_Frame
15) Use intra-frame compression to compress Frame Delta(x') data to delta(x')
16) frames_pointer[x] = ALLOCATE new frame, size of delta(x');
17) frame_pointer[x] is updated. copy delta(x') to new allocated new frame(x)
18) x=x+1;
19) END LOOP
20) FREE temp_Frame

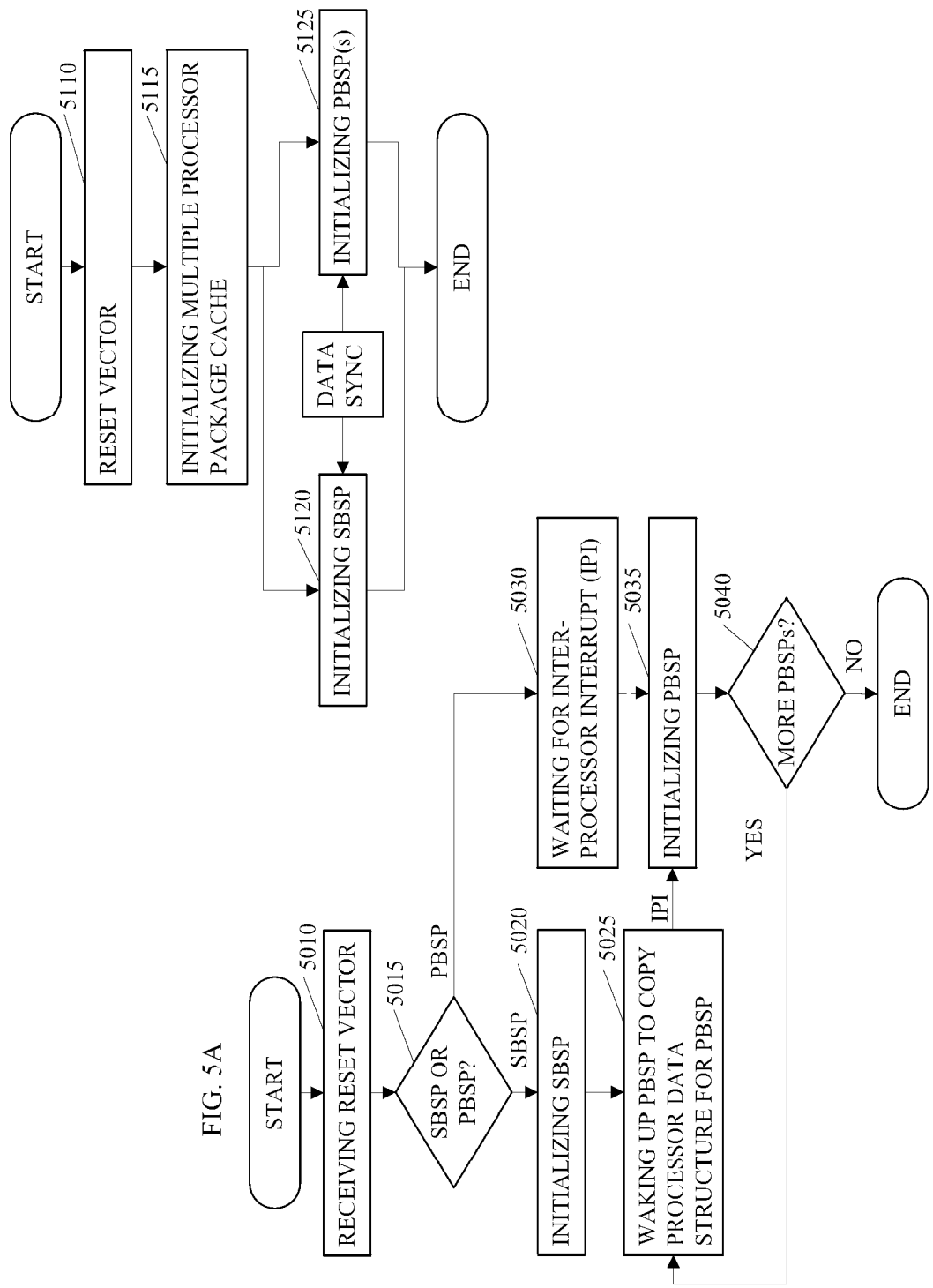

EFFICIENTLY STORING COMPUTER PROCESSOR DATA STRUCTURES IN COMPUTER MEMORY

CROSS-REFERENCE TO RELATED APPLICATION

This application is a national stage application claiming the benefit of and priority to International Application No. PCT/CN2017/103151 entitled "EFFICIENTLY STORING COMPUTER PROCESSOR DATA STRUCTURES IN COMPUTER MEMORY" filed Sep. 25, 2017, which is hereby incorporated by reference in its entirety.

TECHNICAL FIELD

Embodiments described herein are in the field of the memory. More particularly, the embodiments relates to methods and arrangements to efficiently store computer processor data structures in computer memory.

BACKGROUND

The conventional pre-boot code for a computer platform, referred to as the basic input output system (BIOS), is effectively limited to stack-less assembly code or machine code. Some current processors allow the cache to be configured to provide a small amount of read/write data stack, which is often referred to as Cache As Random-access memory (CAR). With stack capability, it is reasonable to write BIOS, Unified Extensible Firmware Interface (UEFI) firmware, or similar pre-boot code for platform initialization in higher level languages, like C. Some server processors, such as the Intel® Xeon® Platinum 8180M Processors, allow a further enhancement in that the pre-boot code may also cache code while using the cache for stack. Caching code while using the cache for stack can significantly improve the execution speed of the pre-boot code.

Self-starting platforms typically designate a single processor core with a self-starting task. This single processor is typically the first processor core in the first processor package socket on the platform and is often referred to as the system bootstrap processor. The self-starting task initializes the platform hardware and boots the main operating system. After power-on reset and prior to performing the memory detection, the pre-boot code configures a single region in cache of the bootstrap processor for read/write data referred to as the DataStack. The pre-boot code may also configure a read only code region referred to as the CodeRegion. The CodeRegion may contain read only code and read only data, which is similar to typical program organizations. The DataStack will be the only writable memory region in cache.

UEFI based BIOS currently uses CAR and C language as early as possible. C language programming normally requires a heap and a stack in a data region. Both the heap and the stack will be allocated from the DataStack and the DataStack size is limited by the bootstrap processor's silicon cache size.

BRIEF DESCRIPTION OF THE DRAWINGS

FIGS. 1B-D depict embodiments of computer memory or cache and registers comprising a memory map to illustrate functionality performed by a memory logic such as the memory logic depicted in FIG. 1A;

FIGS. 4A-D depict pseudo code of embodiments of a memory logic such as the memory logic depicted in FIG. 1A and the functionality performed by the memory logic depicted in FIGS. 1B-D;

FIGS. 5A-B depict flowcharts of embodiments of memory logic such as the memory logic depicted in FIG. 1A and the functionality performed by the memory logic depicted in FIGS. 1B-D and 3A-B.

DETAILED DESCRIPTION OF EMBODIMENTS

Figure 1A:
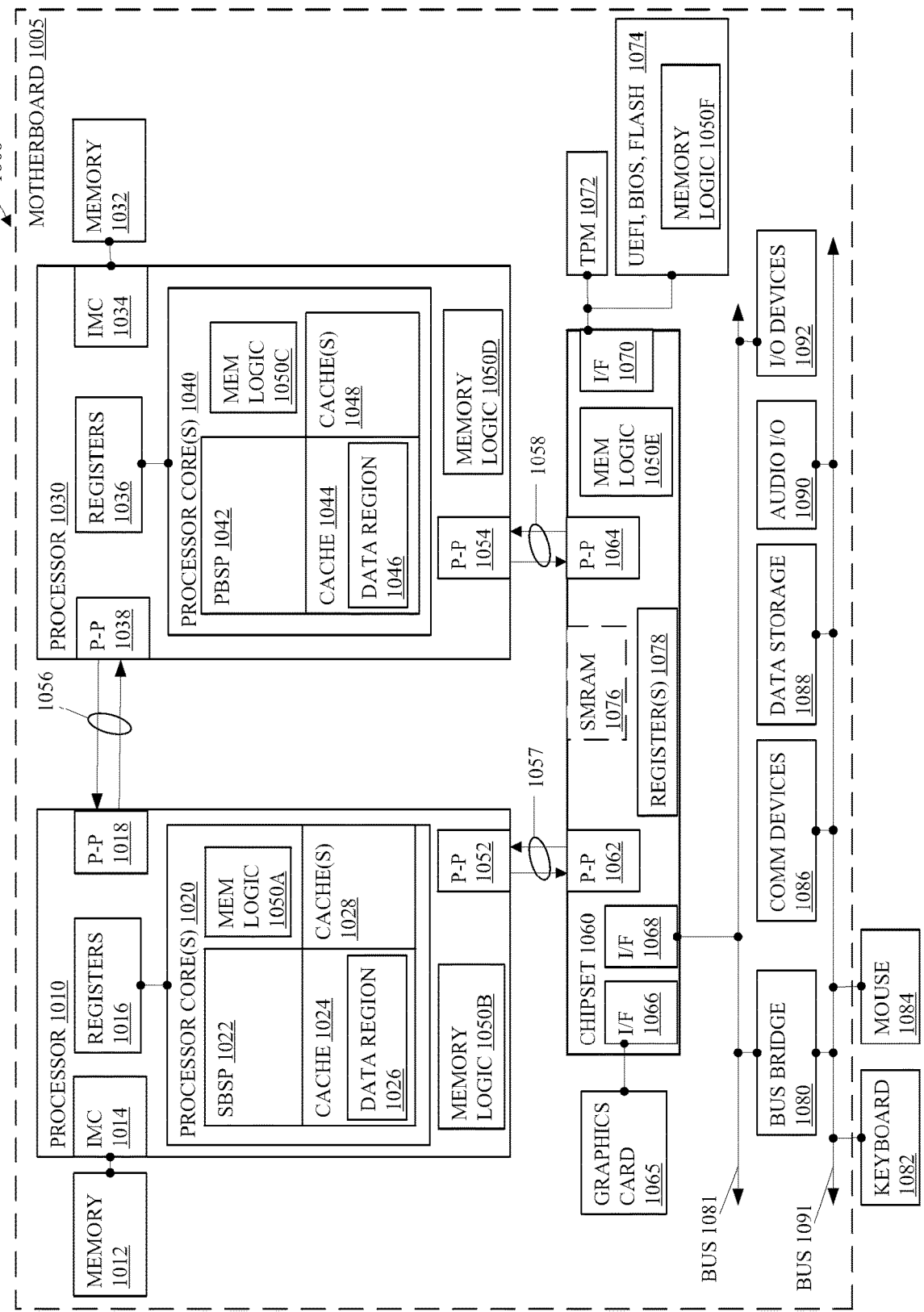
FIG. 1A depicts an embodiment of a system including a multiple-processor platform, a chipset, buses, and accessories.

The following is a detailed description of embodiments depicted in the drawings. The detailed description covers all modifications, equivalents, and alternatives falling within the appended claims.

Generally speaking, methods and arrangements to store computer processor data structures are contemplated. Embodiments may include a memory logic to use computer memory more efficiently to store processor data structures in computer memory such as a processor's cache physically located in a bootstrap processor, system management memory, protected memory, or other memory. The computer platforms may include a system bootstrap processor (SBSP) in a first processor package, package bootstrap processors (PBSPs) in other processor packages, and multiple application processors (APs) that include the other cores or multi-thread processors in the processor packages of the SBSP and the PBSPs. Other embodiments include processors with only one core. Still other embodiments identify the SBSP by a mechanism to select the SBSP amongst the processors after a power-on reset.

The terms "processor" and "computer processor" herein refers to a processor with only one core or a processor package with multiple cores or multi-thread processors. The SBSP is a processor with a single core or a processor core designated as the SBSP in a processor package. Furthermore, for simplicity of describing various embodiments of the invention, the term "cache" and the term "cache memory" are used interchangeably from herein.

Some embodiments include a memory logic to compress the computer processor data structures to reduce the amount of space required to store the processor data structures to avoid stack overflows or heap overflows. Such embodiments decompress the processor data structures to perform initialization. Some embodiments may include the memory logic to increase the amount of space available for storing data in memory. Further embodiments include the memory logic to both compress the processor data structures and increase the amount of space available to store data to avoid stack overflows or heap overflows. The processor data structures may include initial or saved processor states or contexts for one or more cores of a processor, depending on the processor core configuration.

Embodiments may operate within a platform such as a server, desktop, laptop, or tablet platform in pre-boot environments during which the main operating system (OS) for the platform (e.g., one of the various Windows®-based OSs, a Linux®-based OS, a Mac OS, etc.) is not executing. For instance, embodiments may implement the memory logic prior to main memory detection, after main memory initialization but prior to booting a main OS (pre-OS), and during non-main OS environments. Examples of these environments include basic input output system (BIOS) environments and unified extensible firmware interface (UEFI) environments such as the pre-initialization environment (PEI) phase, the driver execution environment (DXE) phase, the system management mode (SMM), other non-x86 and x86 pre-boot code, as well as other environments that require storage of large data structures.

Some embodiments implement the memory logic as code in BIOS code, UEFI firmware, or nonvolatile memory such as read-only memory (ROM) or flash memory. In such embodiments, a system bootstrap processor may execute the code. Other embodiments implement the memory logic as the logic circuitry such as a state machine, an application specific integrated circuit (ASIC), a processor instruction operation via a processor pipeline, a processor register operation, or a chipset operation. The logic circuitry may be configured to implement some or all the functionality described herein for the memory logic.

The memory logic may reside within or outside a processor or processor core, or partially within and partially outside of the processor or processor core. For instance, some embodiments implement the memory logic fully or partially in logic circuitry or nonvolatile memory within a processor, within a chipset coupled with the processor, or on a platform and coupled with the processor either directly via a bus or interconnect, or indirectly via a bus or interconnect coupled with the chipset. Further embodiments implement the functionality of the memory logic partially as code and partially as logic circuitry, advantageously improving the speed and efficiency of functionality implemented in logic circuitry and advantageously offering an ability to update or modify functionality implemented as code in nonvolatile memory like flash memory.

During the PEI phase, a system bootstrap processor may execute code to perform processor, chipset, and platform configuration to support memory discovery. The processor data structures, such as sysHOST, are large data structures and a multiple-processor platform may require multiple processor data structures to be stored in cache to initialize the processors. The SBSP executing the BIOS, UEFI firmware, or possibly vendor specific microcode or assembly code from nonvolatile memory may store the processor data structures in hand-off blocks (HOBs). The SBSP may establish the HOBs in the CAR during the PEI phase and access these HOBs during the DXE phase to facilitate initialization. Copies of the processor data structures reside in the cache so a processor such as the SBSP can process the data to perform initialization.

To illustrate, an eight-processor platform may require storage of eight processor data structures in a data region of the cache of the SBSP. The eight processors may include the SBSP and seven PBSPs. Furthermore, each of these processors may reside in a processor package that includes one or more secondary processor cores. To allocate the data region in the cache, the SBSP may store a bit in a register to set the cache in no eviction mode to prevent data from being evicted from the cache. The SBSP may implement the memory logic to compress the eight processor data structures and/or to increase the amount of cache included in the data region to configure as heap and stack. In some embodiments, the SBSP may implement the memory logic by executing code stored by the memory logic. In other embodiments, the SBSP may communicate with the memory logic to perform functionality of the memory logic. For instance, the SBSP may store data in registers associated with the memory logic to compress or decompress processor data structures.

The SBSP may implement the memory logic to compress the eight processor data structures by determining a reference data structure, determining a difference between a processor's data structure and the reference data structure, and storing the difference between the processor's data structure and the reference data structure. For example, the SBSP may be designated CPU0 on the platform based on the socket within which the SBSP is mounted to the motherboard and the SBSP may choose or select the processor data structure for CPU0 as the reference data structure. In some embodiments, the reference data structure for a processor can be a data structure of that processor's power-up hardware default settings or a data structure of another processor's power-up hardware default settings. In some embodiments, the SBSP may store the processor data structure in the data heap of the data region of the cache and determine the difference between the processor data structure for CPU1 and the processor data structure for CPU0 via the memory logic. Rather than storing the entire processor data structure for CPU1 in the data region of the cache, the SBSP may store the non-zero difference between CPU1 and CPU0 and, in some embodiments, the system bootstrap processor also implements the memory logic to apply one or more data compression techniques to the non-zero difference to further compress the difference for storage in the data region of the cache.

In some embodiments, the non-zero difference comprises a set of one or more linked list data structures that include a set of one or more non-zero values and offsets. Each offset designates a location within the processor data structure of CPU1 for the non-zero value. The SBSP may implement the memory logic to compress subsequent processor data structures (e.g., CPU2) in a similar manner by using the first processor's data structure (CPU0 data structure) as a reference data structure or by using a previously compressed data structure (e.g., CPU1) as a reference data structure. Furthermore, the SBSP may implement decompression logic of the memory logic to decompress the processor data structures for initialization by adding the difference to the corresponding reference data structure.

For situations in which content of the processor data structures might change while stored in the data region of the cache, the SBSP may implement the memory logic to store the processor data structures with a dynamic buffer allocation scheme rather than a single continuous bulk data scheme. For example, the SBSP implements the memory logic to determine a reference data structure, store the reference data structure in the cache, and store a pointer to the reference data structure in the cache. The reference data structure does not change dynamically, but instead, remains static. The SBSP also implements the memory logic to store a pointer data structure for the SBSP and each of the PBSPs that include an address for the location of a difference between the data structure and the reference data structure. Such embodiments can advantageously implement changes to any one of the processors' data structures without affecting the data structure of any of the other processors.

Embodiments may also increase the size of the data region in the cache during the PEI phase by addressing the cache in PBSPs on the platform. The SBSP may implement the memory logic to modify the addresses in registers such as the Memory Type Range Registers (MTRRs) in the SBSP and/or in each of the PBSPs to change the addresses of the cache for each of the PBSPs on the platform. The modifications may establish a unique set of addresses for the cache in each of the processors. In many embodiments, the memory logic also assigns adjacent addresses to the data regions of the caches in the SBSP and each of the PBSPs so that the data region includes a continuous block of addresses for all the caches. The memory logic may also include address decoding logic to facilitate access to the cache of each of the PBSPs installed on a platform. In other embodiments, the memory logic may make less than all the caches accessible and/or define a data region that uses less than all the caches of the SBSP and the PBSPs on the platform.

Once the caches in each of the PBSPs are accessible, the SBSP may implement the memory logic to store processor data structures in the data region of caches of the PBSPs. In some embodiments, the SBSP may instruct a second processor, e.g., CPU1, to store the second processor's (CPU1's) data structure in the second processor's (CPU1's) cache at an address designated by the SBSP via address decoding logic of the memory logic. The SBSP may also implement the memory logic to store a pointer to the start address of that processor's data structure in the PBSP's cache. In such embodiments, the memory logic may or may not compress the processor data structure.

In some embodiments, the SBSP implements the memory logic to compress the second processor's data structure. The SBSP may compress the second processor's data structure by determining a difference between the second processor's data structure and a reference data structure and may only transmit the compressed data structure from the SBSP to the second processor via an inter-processor interconnect, a bus, or one or more registers such as control and status registers (CSRs). Thereafter, the SBSP may transmit a pipe request or a SIPI to transfer data or keep synchronizing to the second processor. In some embodiments, the SBSP transmits the pipe request or the SIPI during the PEI phase and, in other embodiments, the SBSP transmits the SIPI during the DXE phase.

In some embodiments, the SBSP may transmit a SIPI to each PBSP. The SBSP will address each SIPI to one of the PBSPs and each SIPI may include an address for code to execute. This code may instruct each PBSP to perform initialization based on the processor data structure stored in the PBSP's own cache physically located in the PBSP, advantageously reducing traffic on the inter-processor interconnect. In other embodiments, the code may instruct each PBSP to perform initialization based on the processor data structure stored in hand-off blocks (HOBs) or HOBs data transferred to main memory after main memory initialization.

In some embodiments, the SBSP transmits a pipe request to each processor core to instruct each PBSP to load a processor data structure to that PBSP's own cache and to perform initialization based on the processor data structure stored in the PBSP's own cache, advantageously reducing traffic on the inter-processor interconnect. Note that, in some embodiments, the pipe for the pipe request is a set of control and status registers (CSRs) in the uncore. The uncore references circuitry in the processor but not within a processor core.

Further embodiments improve memory usage for Firmware Support Packages (FSPs). A FSP is code containing hardware-specific drivers and other routines that allow a particular operating system such as a real-time operating system (RTOS) to function in a particular hardware environment such as within a platform or on a processor card. For instance, the FSP may initialize an accelerator board with one or more processor cores, a memory controller, and a chipset. The binary package fits in a boot loader. The SBSP may implement the memory logic to compress at least one processor data structure of two or more processor data structures loaded into memory and decompress the at least one processor data structure to initialize the processors of the accelerator board. Compression of the data structure involves determining the difference between the processor data structure and a reference data structure and decompression involves adding the difference to the reference data structure. The SBSP may store the difference as a linked list or bitmap.

Still further embodiments improve memory usage in modes of operation that suspend execution of a main OS and create a management environment such as the system management mode (SMM), a different x86 pre-boot mode, a non-x86 pre-boot mode, or the like. Such embodiments implement the memory logic to compress data structures for processor states or contexts for storage in memory such as system management random access memory (SMRAM). Such embodiments may also implement the memory logic to store the compressed data structures in the data region of the cache of the SBSP and/or in the corresponding PBSPs and decompress the compressed data structures to reload the processor state or context in the PBSPs prior to exiting the mode.

In the SMM, for instance, the SBSP may implement the memory logic to generate data structures based on the current state or context of the SBSP and of one or more other processor cores and to compress the data structures for processor states or contexts for storage in memory such as system management random access memory (SMRAM). Such embodiments may also implement the memory logic to store the compressed data structures in the data region of the cache of the SBSP and/or the corresponding PBSPs and decompress the compressed data structures to reload the processor state or context in the SBSP and the PBSPs prior to exiting the SMM.

One or more different embodiments of the invention advantageously store processor core data structures, reducing data storage requirements for processor data structures in cache, reduce data traffic on inter-processor interconnects, address memory allocation issues associated with dynamic processor data structures by efficiently managing random-access memory, e.g., to avoid stack overflows and heap overflow, and/or the like. For instance, some embodiments that address problems associated with storing processor core data structures may do so by one or more technical means such as compressing and decompressing processor data structures, determining or selecting a reference data structure, determining a difference between the reference data structure and a processor data structure, storing the difference between the reference data structure and the processor data structure in cache or other memory, storing a pointer data structure in the memory with an address or address offset for a reference data structure or a compressed data structure, decompressing a compressed data structure based on a reference data structure, setting registers such as memory type range registers to create unique addresses for the caches of two or more processors on a platform, instructing a processor to store a processor data structure in the corresponding processor's cache, modifying address assignments in registers of more than one processor core, implementing address decoding logic, storing pointers to processor data structures stored in cache of another processor, and transmitting a pipe request to a second processor to instruct the second processor to load a processor data structure into a data region of the second processor's cache, and/or to execute a code at an address and/or to begin initialization based on a processor data structure in cache or other memory.

Several embodiments comprise systems with multiple processor cores such as central servers, access points, and/or stations (STAs) such as modems, routers, switches, servers, workstations, netbooks, mobile devices (Laptop, Smart Phone, Tablet, and the like), sensors, meters, controls, instruments, monitors, home or office appliances, Internet of Things (IoT) gear (watches, glasses, headphones, and the like), field-programmable gate arrays (FPGAs), memory accelerators, and the like. Some embodiments may provide, e.g., indoor and/or outdoor "smart" grid and sensor services. In various embodiments, these devices relate to specific applications such as healthcare, home, commercial office and retail, security, and industrial automation and monitoring applications, as well as vehicle applications (automobiles, self-driving vehicles, airplanes, and the like), and the like.

Turning now to the drawings, FIG. 1A illustrates an embodiment of a system 1000. The system 1000 is a computer system with multiple processor cores such as a distributed computing system, supercomputer, high-performance computing system, computing cluster, mainframe computer, mini-computer, client-server system, personal computer (PC), workstation, server, portable computer, laptop computer, tablet computer, handheld device such as a personal digital assistant (PDA), or other device for processing, displaying, or transmitting information. Similar embodiments are implemented as, e.g., entertainment devices such as a portable music player or a portable video player, a smart phone or other cellular phone, a telephone, a digital video camera, a digital still camera, an external storage device, or the like. Further embodiments implement larger scale server configurations.

As shown in FIG. 1A, system 1000 comprises a motherboard 1005 for mounting platform components. The motherboard 1005 is a point-to-point interconnect platform that includes a first processor 1010 and a second processor 1030 coupled via a point-to-point interconnect 1056 such as an Ultra Path Interconnect (UPI). In other embodiments, the system 1000 may be of another bus architecture, such as a multi-drop bus. Furthermore, each of processors 1010 and 1030 may be processor packages with multiple processor cores including processor core(s) 1020 and 1040, respectively. While the system 1000 is an example of a two-socket (2S) platform, other embodiments may include more than two sockets or may include only one socket. For example, some embodiments may include a four-socket (4S) platform or an eight-socket (8S) platform. Each socket is a mount for a processor and has a socket identifier. Note that the term platform or computer platform refers to the motherboard with certain components mounted such as the processors 1010 and 1030 and the chipset 1060. Some platforms may include additional components and some platforms may only include sockets to mount the processors and/or the chipset.

The first processor 1010 includes an Integrated Memory Controller (IMC) 1014 and point-to-point (P-P) interfaces 1018 and 1052. Similarly, the second processor 1030 includes an IMC 1034 and P-P interfaces 1038 and 1054. The IMC's 1014 and 1034 couple the processors 1010 and 1030, respectively, to respective memories, a memory 1012 and a memory 1032. The memories 1012 and 1032 may be portions of the main memory (e.g., a dynamic random access memory (DRAM)) for the platform such as double data rate type 3 (DDR3) or type 4 (DDR4) synchronous DRAM (SDRAM). In the present embodiment, the memories 1012 and 1032 are locally attached to the respective processors 1010 and 1030. In other embodiments, the main memory may couple with the processors via a bus and shared memory hub.

The processors 1010 and 1030 comprise caches 1028 and 1048, respectively, to represent the cache coupled with each of the processor core(s) 1020 and 1040, respectively, and may be physically located in the respective processors. In the present embodiment, the processor core(s) 1020 of the processor 1010 include a processor core designated as a system bootstrap processor (SBSP) 1022, which comprises a cache 1024 of the caches 1028. Similarly, the processor core(s) 1040 of the processor 1030 include a processor core designated PBSP 1042, which comprises a cache 1044 of the caches 1048. The caches 1024 and 1044 include data regions 1026 and 1046. The data regions 1026 and 1046 are runtime designations for areas of the caches 1026 and 1046 that are illustrated herein for the purposes of discussion of the functionality of the memory logic in the system 1000 including the memory logic 1050A in the processor cores 1020, the memory logic 1050B in the processor 1010, the memory logic 1050C in the processor cores 1040, the memory logic 1050D in the processor 1030, the memory logic 1050E in the chipset 1060, and the memory logic 1050F in the UEFI, BIOS, Flash component 1074.

Note that the "SBSP" and "PBSP" designations are based on the physical sockets in which the processors are installed in the present embodiment. In other embodiments, the processors on the platform may race to set or clear a register such as a register in register(s) 1078 of chipset 1060. The first bootstrap processor to set or clear the corresponding control register may become the SBSP and the remaining PBSPs may enter an idle state to await an inter-processor interrupt or pipe request from the SBSP.

The first processor 1010 couples to a chipset 1060 via P-P interconnects 1052 and 1062 and the second processor 1030 couples to a chipset 1060 via P-P interconnects 1054 and 1064. Direct Media Interfaces (DMIs) 1057 and 1058 may couple the P-P interconnects 1052 and 1062 and the P-P interconnects 1054 and 1064, respectively. The DMI may be a high-speed interconnect that facilitates eight Giga Transfers per second (GT/s) such as DMI 3.0. In other embodiments, the processors 1010 and 1030 may interconnect via a bus. During the PEI phase, the processors 1010 and 1030 can communicate via the P-P interconnects 1018 and 1038 and a set of control and status registers in the registers 1016 and 1036.

The chipset 1060 may comprise a controller hub such as a platform controller hub (PCH). The chipset 1060 may include a system clock to perform clocking functions and include interfaces for an I/O bus such as a universal serial bus (USB), peripheral component interconnects (PCIs), serial peripheral interconnects (SPIs), integrated interconnects (I2Cs), and the like, to facilitate connection of peripheral devices on the platform. In other embodiments, the chipset 1060 may comprise more than one controller hub such as a chipset with a memory controller hub and a graphics controller hub and an input/output (I/O) controller hub.

The chipset 1060 also comprises system management random-access memory (SMRAM) 1076. The SBSP 1022 may implement memory logic 1050A, 1050B, 1050E, and/or memory logic 1050F to compress processor data structures to store in the SMRAM 1076. For instance, the processors 1010 and 1030 may receive a system management interrupt (SMI), instructing the processors 1010 and 1030 to enter a system management mode (SMM). The processors 1010 and 1030 may halt execution of the main operating system (OS) for the duration of the SMM. The SBSP 1022 may switch to a separate address space and execute a system management code from a UEFI, BIOS, FLASH component 1074. The system management code may include instructions to copy the context or state of the processor cores 1020 and/or 1040 into the SMRAM 1076. Note that SMRAM 1076 may reside in different locations than the location in the chipset 1060 shown in FIG. 1A such as in a processor or elsewhere on the platform or in the system 1000 and may connect directly to or indirectly with the processors 1010 and 1030.

The SBSP 1022, for example, may execute the system management code and implement memory logic 1050A, 1050B, 1050E, and/or 1050F to create processor data structures for each of the processor cores 1020 with the state of each of the processor cores 1020, compress the processor data structures including processor state for each of the processor cores 1020, and store the compressed processor data structures in the SMRAM 1076. The SBSP 1022 may compress the processor data structures by determining a reference data structure, storing the reference data structure, and determining a difference between a second processor data structure and the reference data structure. The SBSP 1022 may also store the difference or a compressed version of the difference in the SMRAM 1076. In some embodiments, the SBSP may compress the reference data structure prior to storing the reference data structure in the SMRAM 1076.

The reference processor data structure may represent the state of the first processor core and the second processor data structure may represent the state of the second processor core in the processor cores(s) 1020. The SBSP 1022 may implement the memory logic 1050A, 1050B, 1050E, and/or 1050F to store the first processor core's data structure in the SMRAM 1076 and only store the difference between the second processor core's data structure and the first processor core's data structure to represent the second processor core's data structure in the SMRAM 1076. The difference may be in the form of a linked list or bitmap and, in some embodiments, the SBSP 1022 compresses the difference further via one or more compression methods prior to storing the difference in the SMRAM 1076. For additional processors, the SBSP 1022 may implement the memory logic 1050A, 1050B, 1050E, and/or 1050F to determine and store the difference between a third processor core's data structure and the second processor core's data structure. In other embodiments, the SBSP 1022 may implement the memory logic 1050A, 1050B, 1050E, and/or 1050F to determine and store the difference between the third processor core's data structure and the first processor core's data structure.

In some embodiments, only the SBSP 1022 will execute the functionality of the system management code and the PBSPs and all the other AP's will be halted while in the SMM. In other embodiments, the SBSP 1022 may coordinate storage of the states of each of the cores in more than one of the processors on the platform such as the processor core(s) 1040 in the processor 1030.

After completing the SMM operations, the SBSP 1022 may implement the memory logic 1050A, 1050B, 1050E, and/or 1050F to reload the processor states from the SMRAM 1076. In particular, the SBSP 1022 may implement the memory logic 1050A, 1050B, 1050E, and/or 1050F to set up a data region in the cache 1024, load and decompress, if necessary, the reference processor data structure from the SMRAM 1076. Thereafter, the SBSP 1022 may implement the memory logic 1050A, 1050B, 1050E, and/or 1050F to load the differences stored for each of the other processor cores and decompress the differences by adding the differences to the appropriate reference data structures. For instance, if the data structure for the first processor core is the reference data structure for all the cores, then the memory logic 1050A, 1050B, 1050E, and/or 1050F may add the difference for each of the cores to the reference data structure to decompress the processor data structures. On the other hand, if the first processor core's data structure is the reference data structure for the second processor core and the second processor's core data structure is the reference data structure for the third processor core's data structure, then the memory logic 1050A, 1050B, 1050E, and/or 1050F may add second processor core's data structure to the difference stored for the third processor core. Other embodiments implement a non-x86 mode with pre-boot code that compresses processor data structures with the context or state of the processors to store in a memory, returns the compressed data structures to one or more of the processors, and decompresses the processor data structures either before or after returning the data structures to the one or more processors.

The SBSP 1022 may also implement memory logic 1050A, 1050B, 1050E, and/or 1050F to compress the processor data structures including processor states for each of the processor cores on a graphics card 1065 and to store the compressed processor data structures from a firmware support package (FSP) in the data region of the memory 1012. The SBSP 1022 may compress the processor data structures by determining a reference data structure, storing the reference data structure, and determining a difference between a second processor data structure and the reference data structure. The SBSP 1022 may also store the difference or a compressed version of the difference in the memory 1012. In some embodiments, the SBSP 1022 may compress the reference data structure prior to storing the reference data structure in the memory 1012. The difference may be in the form of a linked list or bitmap and, in some embodiments, the SBSP 1022 may compress the difference further via one or more compression methods prior to storing the difference in the memory 1012.

For additional processors, the SBSP 1022 may implement the memory logic 1050A, 1050B, 1050E, and/or 1050F to determine and store the difference between a third processor core's data structure and the second processor core's data structure. In other embodiments, the SBSP 1022 may implement the memory logic 1050A, 1050B, 1050E, and/or 1050F to determine and store the difference between the third processor core's data structure and the first processor core's data structure.

The SBSP 1022 may implement the memory logic 1050A, 1050B, 1050E, and/or 1050F to decompress the processor data structures and initialize the graphics card 1065. The SBSP 1022 may decompress the differences by adding the differences to the appropriate reference data structures. For instance, if the data structure for the first processor core is the reference data structure for all the cores, then the memory logic 1050A, 1050B, 1050E, and/or 1050F may add the difference for each of the cores to the reference data structure to decompress the processor data structures. On the other hand, if the first processor core's data structure is the reference data structure for the second processor core and the second processor's core data structure is the reference data structure for the third processor core's data structure, then the memory logic 1050A, 1050B, 1050E, and/or 1050F may add second processor core's data structure to the difference stored for the third processor core.

In the present embodiment, the chipset 1060 couples with a trusted platform module (TPM) 1072 and the UEFI, BIOS, Flash component 1074. The TPM 1072 is a dedicated microcontroller designed to secure hardware by integrating cryptographic keys into devices. The UEFI, BIOS, Flash component 1074 may provide pre-boot code and may include the memory logic 1050F.

Furthermore, chipset 1060 includes an interface (I/F) 1066 to couple chipset 1060 with a high-performance graphics engine, graphics card 1065. In other embodiments, the system 1000 may include a flexible display interface (FDI) between the processors 1010 and 1030 and the chipset 1060. The FDI interconnects a graphics processor core in a processor with the chipset 1060.

The memory logic 1050A, 1050B, 1050C, 1050D, 1050E, and 1050F may represent logic circuitry or nonvolatile memory such as flash memory or read-only memory (ROM). In some embodiments, each of the memory logic 1050A, 1050B, 1050C, 1050D, 1050E, and 1050F exists on the platform. In other embodiments, only one or less than all the memory logic 1050A, 1050B, 1050C, 1050D, 1050E, and 1050F exist on the platform to perform all or selected functionality described herein for the memory logic.

The memory logic 1050A, 1050B, 1050C, and 1050D reside within the processor packages of the processors 1010 and 1030, the memory logic 1050E resides in the chipset 1060, and the memory logic 1050F resides in UEFI, BIOS, Flash component 1074 connected to I/F 1070 via a serial peripheral interconnect (SPI). In some embodiments, the memory logic 1050A, 1050B, 1050C, 1050D, 1050E, and 1050F comprise code for execution to implement functionality of the memory logic. In other embodiments, the code for implementing the memory logic resides fully in the memory logic 1050A and 1050C or 1050B and 1050D of the processors 1010 and 1030, respectively, or resides fully in the memory logic 1050F in the UEFI firmware, BIOS code, or flash memory in the UEFI, BIOS, Flash component 1074. In still other embodiments, the memory logic 1050A and 1050C, 1050B and 1050D, or 1050F is one or more state machines, application specific integrated circuits (ASICs), and/or instruction pipelines within the processors 1010 and 1030, the processor cores 1020 and 1040, or the chipset 1060 to implement all or part of the functionality of the memory logic and the memory logic 1050F includes part or none of the functionality of the memory logic described herein in the form of code.

During the PEI phase, the SBSP 1022 loads an initial assembly code into the cache to begin execution of the basic input output system (BIOS), UEFI firmware, or similar platform initialization code, or pre-boot code and allocates a data region 1026 in the cache 1024, which includes storing a bit in a register 1016 to set the cache in no eviction mode to prevent eviction of data from the cache 1024. Thereafter, the SBSP 1022 loads a compiler and code in a higher language such as C and begins to compile and execute the code using the limited space available in a data region 1026 of the cache 1024 of SBSP 1022. In several embodiments, the SBSP 1022 also stores data structures such as processor data structures in hand-off blocks (HOBs).

Figure 1B:
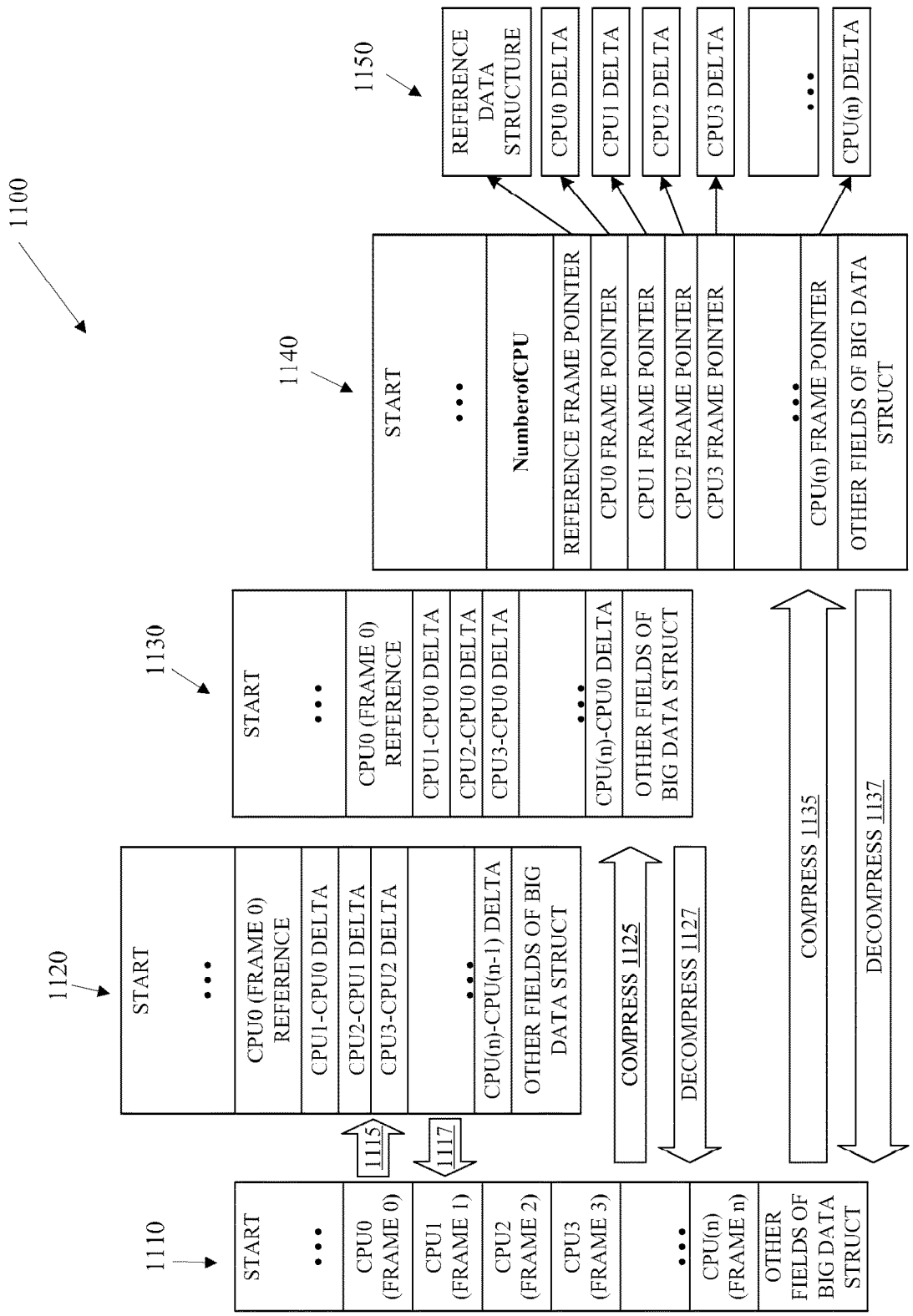

Referring now to FIGS. 1A and 1B, FIG. 1B illustrates embodiments 1100 of the memory logic compression and decompression functionality. The memory logic 1050A, 1050B, 1050E, and/or 1050F may comprise one or more of three alternative initial compression functions 1115, 1125, 1135 and decompression functions 1117, 1127, and 1137. Each of these three alternatives are illustrated in the form of the resulting processor data structures that the SBSP 1022 may store in the cache 1024 by implementation of the memory logic 1050A, 1050B, 1050E, and/or 1050F.

The cache 1110 depicts the data region 1026 in the cache 1024 with large data structures for n+1 processors (CPU0-CPUn) that are not compressed. The SBSP 1022 may compress 1115 the n+1 processor data structures to reduce the space used in the cache 1024 as illustrated in the cache 1120. In particular, the SBSP 1022 may implement the memory logic 1050A, 1050B, 1050E, and/or 1050F to determine a reference data structure. The SBSP 1022 may determine the reference data structure by selecting the first processor data structure, CPU0, and storing the data structure for CPU0 in the cache 1120. In some embodiments, the memory logic 1050A, 1050B, 1050E, and/or 1050F include one or more compression procedures to compress the reference data structure such as a JPEG compression procedure.

As illustrated in cache 1120, the SBSP 1022 stores the difference (CPU1-CPU0 delta) between the data structure for CPU1 and the data structure for CPU0 in the cache 1120 to represent the data structure for CPU1. The SBSP 1022 stores the difference (CPU2-CPU1 delta) between the data structure for CPU2 and the data structure for CPU1 in the cache 1120 to represent the data structure for CPU2. The SBSP 1022 stores the difference (CPU3-CPU2 delta) between the data structure for CPU3 and the data structure for CPU2 in the cache 1120 to represent the data structure for CPU3. This process continues through the data structure for CPU(n), which is represented in the cache 1120 by the difference, CPU(n)-CPU(n−1) delta.

In the present embodiment, the SBSP 1022 implements the memory logic 1050A, 1050B, 1050E, and/or 1050F to store the differences, or deltas, between the processor data structures and the reference data structures as linked lists of non-zero differences between the processor data structures and the reference data structures in a computer memory. In other embodiments, the SBSP 1022 stores the differences between the processor data structures and the reference data structures as bitmaps of non-zero differences between the processor data structures and the reference data structures. Further embodiments choose the smaller of the non-zero differences and the zero differences to store in a computer memory. For example, a bit of the difference data structure within which the SBSP 1022 stores the difference may be set to a logical one to indicate that the linked list or bitmap describes bits that are different. This reduces the size of the difference for situations in which the data structures are predominantly the same. Furthermore, the bit may be set to a logical zero to indicate that the linked list or bitmap describes the bits that are the same. This reduces the size of the difference for situations in which the data structures are predominantly different. In several embodiments, the SBSP 1022 may implement the memory logic 1050A, 1050B, 1050E, and/or 1050F to further compress the differences by one or more compression techniques prior to storing the differences in the cache 1120.

The data structure for the linked list may comprise a value for an offset and a difference value, or delta value, to indicate the difference between the processor data structures. For instance, the delta value may represent eight bits or an octet and the value for the offset may represent the number of octets between the start of the data structure and the delta value. In other embodiments, delta value may include more or less bits or the number of bits may vary between entries in the linked list.

Thereafter, the SBSP 1022 may implement the memory logic 1050A, 1050B, 1050E, and/or 1050F to decompress 1117 the processor data structures in cache 1120 and transmit the data structures to the corresponding processors for initialization. The SBSP 1022 may decompress the reference data structure to reverse any compression operations applied to the reference data structure prior to storage in the cache 1120. For each of the differences such as CPU1-CPU0 delta, the SBSP 1022 may decompress the difference to reverse any compression operations applied to the difference prior to storage in the cache 1120 and then combine the difference with the data structure for CPU0 to determine the structure for CPU1. The SBSP 1022 may apply the same process for each of the differences through the difference for CPU(n). In some embodiments, the SBSP 1022 combines the difference for, e.g., CPU(n) with the data structure for CPU(n-1) by copying the data structure for CPU(n-1) from hand-off blocks (HOBs) created by the SBSP 1022 that include data structures for each of the processors. In other embodiments, the SBSP 1022 combines the difference with a decompressed data structure for CPU(n-1).

In other embodiments, the SBSP 1022 may implement the memory logic 1050A, 1050B, 1050E, and/or 1050F to decompress 1117 the processor data structures in a HOB or in the main memory 1012 after initialization of the memory 1012. In such embodiments, the SBSP 1022 may instruct the PBSP 1042 to store a copy of the processor data structure for PBSP 1042 into the memory 1032 and may transmit a SIPI to the PBSP 1042 along with an address for code to perform initialization based on the processor data structure in the memory 1032.

In the alternative compression 1125 illustrated in the cache 1130, the SBSP 1022 may implement the memory logic 1050A, 1050B, 1050E, and/or 1050F to determine differences between each of the processor data structures based on the same reference data structure. In some embodiments, the SBSP 1022 determines the reference data structure by selecting the first processor data structure. In other embodiments, the SBSP 1022 selects the reference data based on a size of the differences between the reference data structure and data structures of each of the other processors. In such embodiments, the SBSP 1022 may calculate the differences or may perform a correlation operation to correlate the data structures of each processor against the other processors.

As discussed with respect to cache 1120, the SBSP 1022 may apply additional compression operations to the reference data structure and/or the differences prior to storing the reference data structure and the differences in the cache 1130. The differences in the cache 1130 may include linked lists, bitmaps, or other data structures and may, in some embodiments, include a bit to invert the resulting differences to either store a data structure including non-zero differences or store a data structure including zero differences.

Thereafter, the SBSP 1022 may implement the memory logic 1050A, 1050B, 1050E, and/or 1050F to decompress 1127 the processor data structures in the cache 1130 or in the memory 1012 and transmit the data structures to the corresponding processors for initialization. The SBSP 1022 may decompress the reference data structure to reverse compression techniques applied, if any, prior to storage in the cache 1130 or in the memory 1012. For each of the differences such as CPU(n)-CPU0 delta, the SBSP 1022 may decompress the difference to reverse any compression operations applied to the difference prior to storage in the cache 1130 or the memory 1012 and then combine the difference with the data structure for CPU0 to determine the structure for CPU(n). The SBSP 1022 may implement the memory logic 1050A, 1050B, 1050E, and/or 1050F to apply the same process for each of the differences through the difference for CPU(n). In some embodiments, the SBSP 1022 implements memory logic 1050A, 1050B, 1050E, and/or 1050F to combine the difference for, e.g., CPU(n) with the data structure for CPU0 by copying the data structure for CPU0 from hand-off blocks. In other embodiments, the SBSP 1022 combines the difference with a decompressed data structure for CPU0.

In the alternative compression 1135 illustrated in the cache 1140, the SBSP 1022 may implement the memory logic 1050A, 1050B, 1050E, and/or 1050F to store a data structure of pointers in the cache 1140 and store the reference data structure and the differences in different portions 1150 of the cache 1140. This embodiment may be advantageous in situations for which the data structures may change during the process of storing the data structures in the cache 1024 of the SBSP 1022.

The SBSP 1022 may implement the memory logic 1050A, 1050B, 1050E, and/or 1050F to determine a number of pointer entries for the pointer data structure based on the number of PBSPs in the system 1000. The SBSP 1022 may also include pointers for overhead such as a pointer for the reference data structure and one or more pointers for the pointer data structure, designated as NumberofCPU in the cache 1140.

The SBSP 1022 may implement the memory logic 1050A, 1050B, 1050E, and/or 1050F to determine a reference data structure and store the reference data structure in the different portions 1150 of the cache 1140 and store a pointer (a system address or an address offset) for the reference data structure in the pointer data structure. The different portions 1150 of the data region of the cache 1140 may be deallocated and reallocated to facilitate changes in sizes of the differences, CPU0 delta through CPU (n) delta, if the corresponding processor data structure changes prior to initialization or prior to entering the DXE phase of platform initialization. Furthermore, the reference data structure in this embodiment remains static so that updates, if any, are made to the differences. To facilitate the inclusion of the static data structure reference, the SBSP 1022 selects the reference data structure and copies the reference data structure to the different portions 1150 of the cache 1140 and then determines a difference between the reference data structure and each of the processors. For instance, if the SBSP 1022 selects the data structure for CPU0 to be the reference data structure, the SBSP 1022 stores the data structure for CPU0 in the different portions 1150 of the cache 1140 and sets the pointer for the reference data structure. The SBSP 1022 also determines a difference, which may be null, between the data structure for CPU0 and the reference data structure and stores the difference, CPU0 delta, in the different portions 1150 of the cache 1140. This process is repeated for each processor data structure.

As discussed with respect to cache 1120, the SBSP 1022 may apply additional compression operations to the reference data structure and/or the differences prior to storing the reference data structure and the differences in the different portions 1150 of the cache 1140. The differences in the different portions 1150 of the cache 1140 may include linked lists, bitmaps, or other data structures and may, in some embodiments, include a bit to invert the resulting differences to either store a data structure including non-zero differences or store a data structure including zero differences.

The SBSP 1022 may implement the memory logic 1050A, 1050B, 1050E, and/or 1050F to decompress 1137 the processor data structures in the different portions 1150 of the cache 1140 and transmit the data structures to the corresponding processors for initialization. The SBSP 1022 may decompress the reference data structure to reverse compression techniques applied to the reference data structure prior to storage in the different portions 1150 of the cache 1140. For each of the differences, CPU0 delta through CPU(n) delta, the SBSP 1022 may decompress the difference to reverse any compression operations applied to the difference prior to storage in the different portions 1150 of the cache 1140 and then combine the difference with the reference data structure in the different portions 1150 of the cache 1140 to determine each processor data structure.

Note that the SBSP 1022 may implement functionality described in conjunction with FIG. 1B during the DXE phase of platform initialization also. During the DXE phase, the SBSP 1022 may store other CPU data structures such as additional cores for the APs, processor cores on accelerator boards such as a graphics engine, and the like. For instance, the SBSP 1022 may initialize an accelerator board with two or more processors during the DXE phase after the main memory is initialized. The SBSP 1022 may select a data structure for a first processor of the two or more processors as the reference data structure and compress the other one or more processor data structures for the accelerator board. The SBSP 1022 may compress the other one or more processor data structures by any of the processes described with respect to FIGS. 1B-D and decompress the processor data structures in the cache of the processors to initialize prior to initialization but may use the main memory in addition to the cache for storage of processor data structures prior to performing initialization.

Figure 1C:
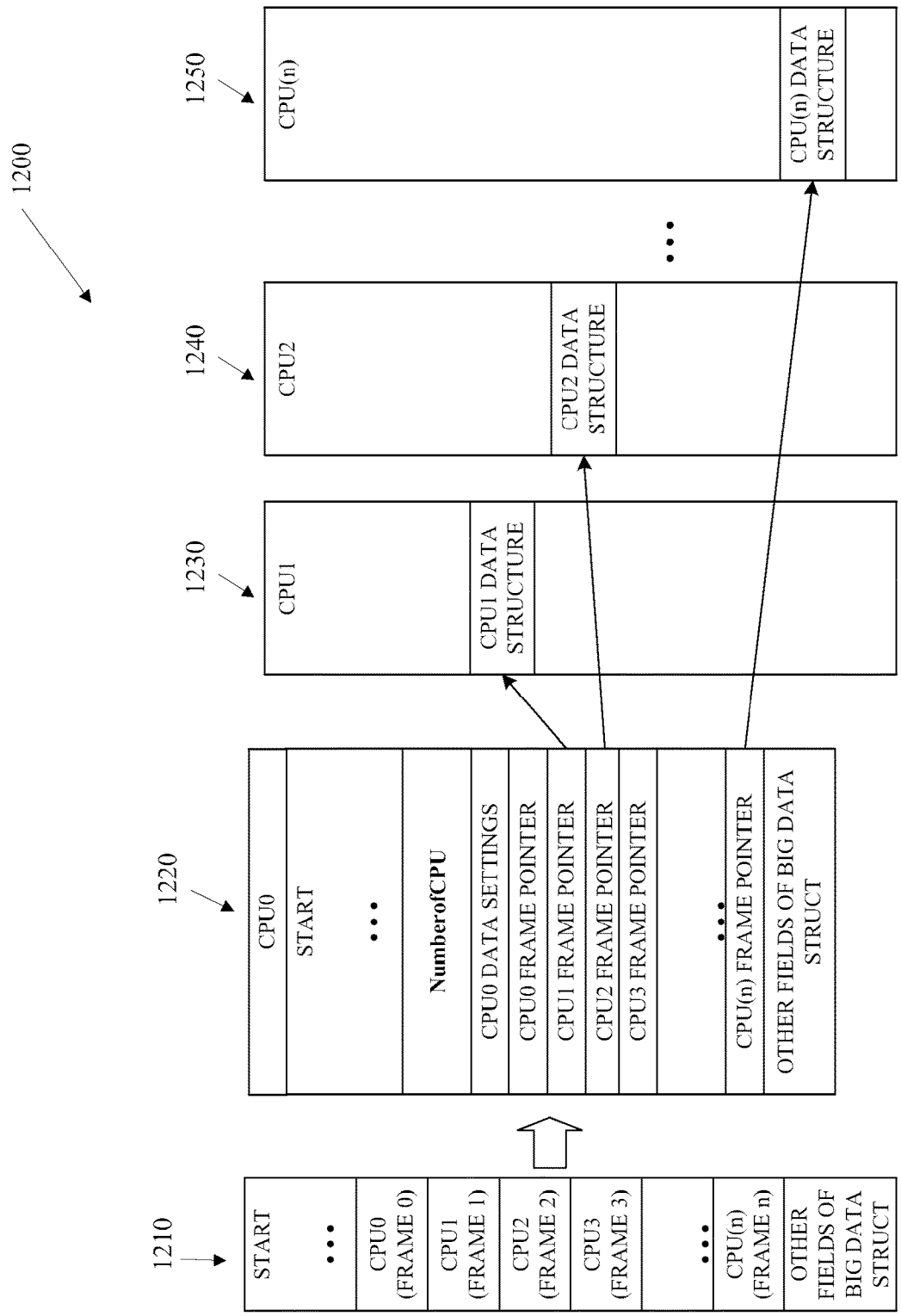

Referring now to FIGS. 1A, 1C, and 1D, FIG. 1C illustrates embodiments 1200 of the memory logic 1050A, 1050B, 1050E, and/or 1050F to expand the available data region in cache and FIG. 1D illustrates an embodiment of a system memory map 1300 stored in memory type range registers of the PBSPs such as the registers 1016 in the processor 1010 and the registers 1036 in the processor 1030 for the pre-main memory detection environment.

The SBSP 1022 may start execution of the pre-boot code such as PEI code or BIOS code and establish a large data structure in the data region 1026 of the cache 1024. FIG. 1C illustrates the data region 1026 of the cache 1024 as the cache 1210. The SBSP 1022 stores the processor data structure for each of the processors in the system 1000 in the cache 1210 including the data structure for the SBSP 1022. The caches 1220, 1230, 1240 and 1250 illustrate a new structure based on implementation of the memory logic 1050A, 1050B, 1050E, and/or 1050F. The SBSP 1022 stores a pointer data structure, NumberofCPU in the cache 1220. In the pointer field of NumberofCPU, the SBSP 1022 may store a pointer for the last processor data structure, CPU(n) Frame Pointer, as well as a value indicating the number of processor data structures in the pointer data structure. The pointer data structure includes the default data settings for the SBSP 1022, CPU0 Data Settings, as well as pointers to addresses or address offsets for the processor data structures in the Cache-As-RAMs (CARs) of each of the PBSPs in the system 1000 such as a processor data structure in the data region 1046 in the cache 1044 of PBSP 1042. The pointer data structure, NumberofCPU, also includes other fields of the big data structure such as sysHOST or another big data structure suitable for initialization of multiple processors in system 1000.

The CPU0 Data Settings may include default settings to set the address ranges for the CAR in each of the other PBSPs. FIG. 1D illustrates an embodiment of a system address map 1300 that includes the address settings for the CAR in the Memory Type Range Registers (MTRRs) of each of the PBSPs. The columns in the system address map represent the address settings for the MTRRs for the AP listed at the top of the columns. For instance, the first column 1330 describes the CAR address ranges for CPU0, which may be the SBSP 1022. The rows 1310 illustrate the address ranges for the CodeRegion of the CAR for each of the processors CPU0 through CPU(n). The rows 1320 illustrate the address ranges for the data region, which is also referred to as the DataStack in the CAR. The data region is two megabytes (MB) in the present embodiment. The SBSP 1022 may divide the data region of the CAR into 1 MB for stack and 1 MB for heap to provide memory to store code and data in the read/write memory.

The SBSP 1022 may implement address setting logic of the memory logic 1050A, 1050B, 1050E, and/or 1050F to set the MTRRs in each of the processors to unique address ranges. In some embodiments, the unique address ranges are set to be adjacent to create one continuous block of addresses for the CARs of the PBSPs in the system 1000. In some embodiments, the SBSP 1022 may instruct the PBSPs such as PBSP 1042 to set the MTRRs in their respective processors such as processor 1030. The SBSP 1022 may instruct the PBSP 1042 to set the MTRRs by transmitting a pipe request or, in other embodiments, a start-up interprocessor interrupt to wake the processor along with a pipe request having an address of a memory logic 1050C or 1050D function to implement to set the MTRRs or having code to execute to set the MTRRs.

In the present embodiment, the SBSP 1022 may implement address setting logic in the memory logic 1050A, 1050B, 1050E, and/or 1050F to set the address ranges adjacent to one another by incrementing the address range of each processor based on the socket identifier and the total number of bytes in the data region of the particular processor such as 2 MB. For instance, some platforms may include more than one model of processor and the different models of the processors may include different amounts of the CAR available to use as the data region. Thus, in many embodiments, the SBSP 1022 may determine the address range for each processor based on the size of the CAR that can be allocated to the data region.

In the present embodiment, the processors, CPU0 through CPU(n) have the same amount of the CAR that can be allocated to the data region so the address ranges are calculated by multiplying the socket identifier by 2 MB and subtracting the result from the address 0xFE9F FFFF to determine the upper address of the data region in the CAR and multiplying the socket identifier by 2 MB and subtracting the result from the address 0xFE8 0000 to determine the lower address of the data region in the CAR. The row 1324 illustrates the lower addresses of the data region in for this model of processor and the row 1322 illustrates the upper addresses for the data region for each of the CARs. Note that the addresses for the CAR and the size of the MTRRs may vary between different embodiments.

After modifying and setting the address ranges for the data region, the SBSP 1022 may implement address decoding logic of the memory logic 1050A, 1050B, 1050E, and/or 1050F to store the CPU0 data structure in the cache 1024 and store a pointer to the CPU0 data structure in the pointer data structure illustrated in the cache 1220. The SBSP 1022 may also send a pipe request to instruct the CPU1 to store the CPU1 data structure in the CAR 1230 of the CPU1 and store a pointer to the CPU1 data structure in the pointer data structure illustrated in the cache 1220. The SBSP 1022 may send pipe requests to instruct the CPU2 through CPU(n) to store the CPU2 through CPU(n) data structures in the corresponding CARs 1240 through 1250 and may store pointers to the CPU2 through CPUn data structures in the pointer data structure illustrated in the cache 1220.

Thereafter, the SBSP 1022 may transmit pipe requests to instruct the PBSPs to perform initialization with the processor data structures stored at specific addresses within their respective CARs. The SBSP 1022 may transmit the address for each processor data structure from the pointer data structure in the cache 1220 of the SBSP 1022. In other embodiments, the transmit a start-up inter-processor interrupt (SIPI) to wake the PBSPs and instruct the PBSPs to begin initialization.

In some embodiments, the SBSP 1022 may implement the memory logic 1050A, 1050B, 1050E, and/or 1050F to determine a reference data structure, determine a difference between the reference data structure and the processor data structures of one or more of the PBSPs in the system 1000, and instruct the one or more of the PBSPs in the system 1000 to store the differences at specified addresses within their CARs. For instance, the SBSP 1022 may instruct the PBSP 1042 to store the difference between the data structure for the PBSP 1042 and the reference data structure in the data region 1046 in cache 1044 of PBSP 1042 and the SBSP 1022 may store the address of the difference in a pointer data structure in the data region 1026 of the cache 1024 of SBSP 1022.

Referring again to FIG. 1A, various I/O devices 1092 couple to the bus 1081, along with a bus bridge 1080 which couples the bus 1081 to a second bus 1091 and an I/F 1068 that connects the bus 1081 with the chipset 1060. In one embodiment, the second bus 1091 may be a low pin count (LPC) bus. Various devices may couple to the second bus 1091 including, for example, a keyboard 1082, a mouse 1084, communication devices 1086, and a data storage unit 1088 that may store code. Furthermore, an audio I/O 1090 may couple to second bus 1091. Many of the I/O devices 1092, the communication devices 1086, and the data storage unit 1088 may reside on the motherboard 1005 while the keyboard 1082 and the mouse 1084 may be add-on peripherals. In other embodiments, some or all the I/O devices 1092, communication devices 1086, and the data storage unit 1088 are add-on peripherals and do not reside on the motherboard 1005.

Figure 2:
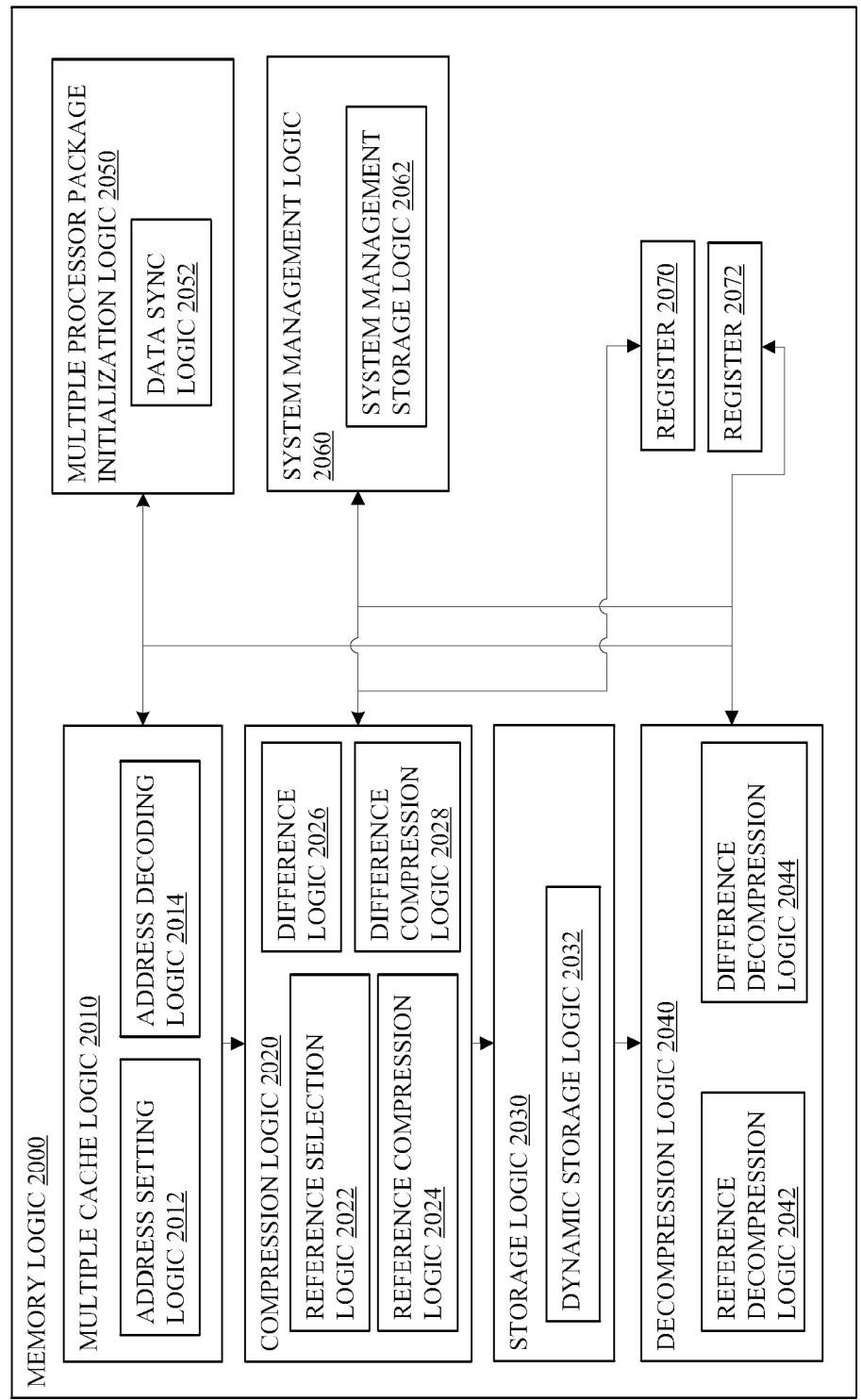
FIG. 2 depicts an embodiment of an apparatus comprising the memory logic.

FIG. 2 depicts an embodiment of an apparatus comprising the memory logic 2000. The memory logic 2000 may compress data for storage in cache, system management memory, protected memory, or other memory; may decompress the data for initialization; and/or may expand the size of the data region for storing data in the cache by making the cache in multiple PBSPs in a system addressable during the PEI phase or prior to main memory initialization. The memory logic 2000 may comprise more or less functionality depending on the specific system in which the memory logic 2000 is deployed. In some embodiments, the memory logic 2000 may contain all or some of the functionality within the pre-boot code or a vendor-specific code for a system. In some embodiments, the memory logic 2000 contains all or some of the functionality within logic circuitry such as a state machine, an ASIC, a processor pipeline, or the like, in a processor, processor core, a chipset, or otherwise located on a motherboard for a system. Still further embodiments implement memory logic 2000 as a combination of circuitry and code for execution by a processor. Many embodiments establish default functionality for use or include only certain functionality of the memory logic 2000. For example, the bootstrap processor may comprise an instruction that performs memory logic operations including compression and decompression on values stored in one or more registers such as the registers 2070 and 2072 in FIG. 2 and the registers 1016 and 1036 in the processors 1010 and 1030, respectively, in FIG. 1A.

While discussions herein may describe functionality performed by the memory logic 2000, the system bootstrap processor that performs other functions related to platform initialization may coordinate the functionality performed by the memory logic 2000 with other functions performed during platform initialization.

The memory logic 2000 may comprise a multiple cache logic 2010, a compression logic 2020, a storage logic 2030, a decompression logic 2040, a multiple processor package initialization logic 2050, and a system management logic 2060. In some embodiments, the memory logic 2000 also comprises one or more registers or have access to perform operations on one or more registers such as registers 2070 and 2072. In such embodiments, the memory logic 2000 may store a reference data structure in register 2070 and a second processor data structure or a difference between the second processor data structure and the reference data structure in the register 2072. Thereafter, the memory logic 2000 may perform the compression logic 2020 or the decompression logic 2040 in one or more clock cycles and output the result to another register, a location in cache, a location associated with an address received along with the reference data structure, a location in SMRAM, a location on an accelerator card, or a location in other memory.

The multiple cache logic 2010 may select the PBSPs' caches that will be included in a data region for storing processor data structures. If the multiple cache logic 2010 determines that a single processor cache will contain the data region, the processing may advance to the compression logic 2020.

For situations in which the cache of multiple processors will form the data region, the multiple cache logic 2010 may comprise address setting logic 1012 and address decoding logic 2014. The address setting logic 2012 may determine ranges of addresses for the data region in the caches of each of the processors and modify or set registers to include the ranges of the addresses for the data region in the processors. The address setting logic 2012 may determine the amount of space available in each of the caches, determine the amount of space in each of the caches to allocate to the data region, and determine a range of addresses to associate with the data region in each of the caches. In many embodiments, the address setting logic 2012 may set the ranges of addresses for the caches to be adjacent so that the data region has one continuous block of addresses.

The address decoding logic 2014 may decode addresses for the bootstrap processor to facilitate storage of processor data structures in each of the caches of the processors. The address decoding logic 2014 may also decode addresses for the bootstrap processor to facilitate updates, if changes can occur, to the processor data structures in each of the processors' caches during the, e.g., PEI phase of the platform initialization.

The compression logic 2020 may compress processor data structures. The compression logic 2020 may comprise a reference selection logic 2022, a reference compression logic 2024, a difference logic 2026, and a difference compression logic 2028. The reference selection logic 2022 may select a default processor data structure as a reference data structure or may compare the processor data structures to select the processor data structure that minimizes the size of differences between that processor structure and the other processor structures.

The reference compression logic 2024 may provide one or more compression techniques to reduce the size of the reference data structure. For example, the reference compression logic 2024 may generate a statistical model for the reference data structure and use the statistical model to map the reference data structure to bit sequences in such a way that frequently encountered bit sequences will produce a shorter output than less frequently encountered bit sequences. In one embodiment, the reference compression logic 2024 may comprise arithmetic coding to create a compressed reference data structure.

The difference logic 2026 may determine a difference between a processor data structure and the reference data structure at least for the first processor data structure. In some embodiments, the difference logic 2026 determines the difference by subtracting the bit sequence of the reference data structure from the bit sequence of the first processor data structure. In some embodiments, the difference logic 2026 stores the difference as a linked list of non-zero values rather than a bit sequence to compress the difference. In other embodiments, the difference logic 2026 stores the difference as a bitmap or a bit sequence.

The difference compression logic 2028 may compress the difference such as the linked list or the bitmap by one or more encoding techniques or compression techniques such as a JPEG compression commonly used to compress digital images. Such action creates a compressed difference for storage in the computer memory. The memory logic 2000 may also compress the bitmap by dividing the bitmap into blocks and sub-blocks of bit sequences and indicating which blocks and sub-blocks are all logical ones by inclusion of block indexes and sub-block indexes.

The storage logic 2030 may store the compressed or decompressed processor data structures in a location in a data region of cache, a SMRAM, a protected memory, a main memory, or another memory. The storage logic 2030 may comprise a dynamic storage logic 2032. The dynamic storage logic 2032 may store a pointer data structure in a first location of a data region in cache or memory, store processor data structures or differences in other locations in the data region, and store addresses or address offsets in the pointer data structure. The addresses may point to the processor data structures or differences stored in other locations of the data region.

The decompression logic 2040 may decompress processor data structures. The decompression logic 2040 may add a difference between a reference data structure and a processor data structure to decompress the processor data structure. For example, the decompression logic 2040 may add a bitmap to the reference data structure to decompress the processor data structure or may add values from a linked list to corresponding locations of the bits in the reference data structure based on the offsets included with the values in the linked list.

The decompression logic 2040 may comprise a reference decompression logic 2042 and a difference decompression logic 2044. The reference decompression logic 2042 may reverse one or more compression techniques applied to the compressed reference data structure. For example, the reference decompression logic 2042 may reverse an arithmetic coding by applying an arithmetic decoding to the compressed reference data structure.

The difference decompression logic 2044 may decompress the difference such as the linked list or the bitmap with one or more decoding techniques or decompression techniques such as a JPEG decompression.

After decompressing one or more of the processor data structures, the memory logic 2000 may initialize one or more processors. For instance, the memory logic 2000 may decompress a processor data structure in the in the cache of the SBSP or the main memory coupled with the SBSP, transmit a pipe request to copy the processor data structure to the HOBs of a PBSP, and transmit a SIPI or a pipe request to instruct the PBSP to perform initialization. In other embodiments, the SBSP may transmit a pipe request to copy the compressed processor data structure for the PBSP in the main memory for the PBSP, instruct the PBSP to decompress the compressed processor data structure with another processor data structure such as a default processor data structure, and instruct the PBSP to perform initialization based on the processor data structure.

The multiple processor package initialization logic 2050 may instruct processors to store a processor data structure or a compressed processor data structure in the cache of the processor and may instruct the processor to execute an initialization procedure with the processor data structure stored in the cache of the processor. The multiple processor package initialization logic 2050 may comprise a data sync logic 2052 to perform updates to the processor data structures stored in one or more of the processors based on changes that occur prior to initialization of the processors. The data sync logic 2052 may also synchronize global configuration data between the system bootstrap processor and the package bootstrap processors.

The system management logic 2060 may halt execution by processors of the main operating system, copy the context or state of multiple processor cores into data structures and initiate the compression logic 2020. The compression logic 2020 may compress the processor data structures and the system management storage logic 2062 may store the processor data structures in the SMRAM.

Upon completion of the SMM functions, the system management logic 2060 may copy the processor data structures from the SMRAM and initiate decompression of the processor data structures. The system management logic 2060 may reload the context or state of the processors after the decompression logic 2040 decompresses the corresponding processor data structures and may restart the processors upon exiting the SMM mode.

Figure 3B:
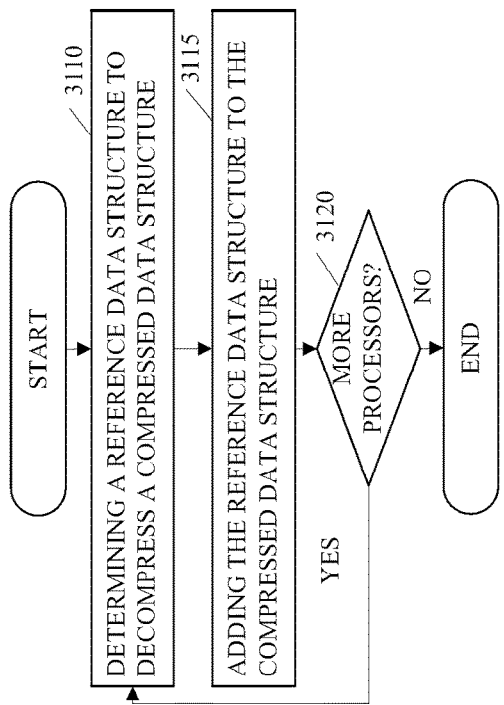
FIGS. 3A-B depict flowcharts of embodiments implementing memory logic such as the memory logic depicted in FIG. 1A and the functionality for the memory logic depicted in FIGS. 1B-D.
Figure 3A:
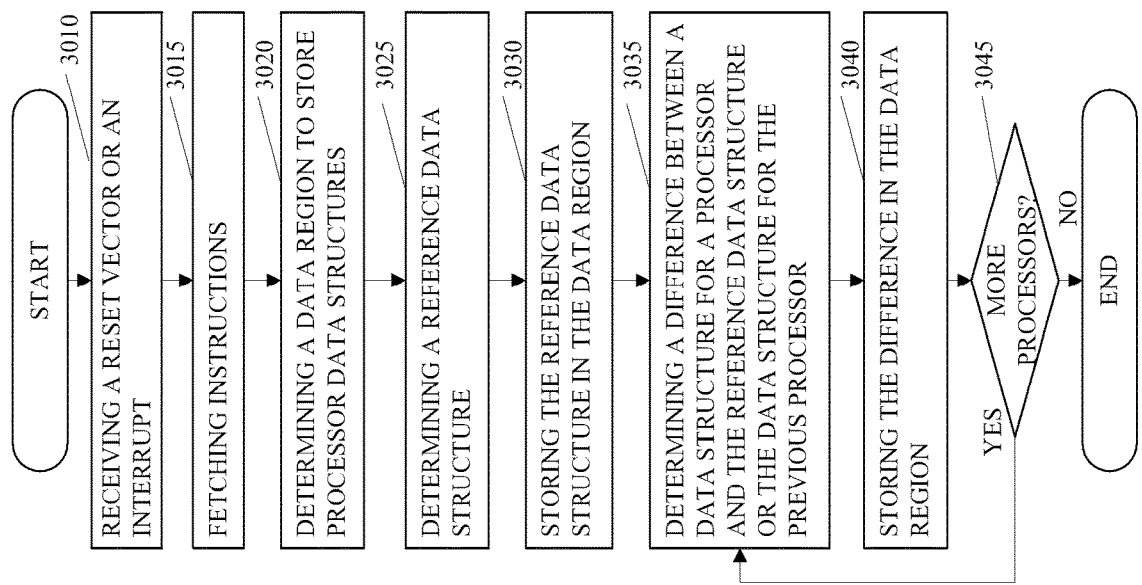

FIGS. 3A-B depicts flowcharts of embodiments implementing memory logic such as the memory logic depicted in FIGS. 1A and 2 as well as the functionality for the memory logic depicted in FIGS. 1B-D. FIG. 3A illustrates a flowchart of the SBSP implementing memory logic to generate a compressed processor data structure. The flowchart starts with receiving a reset vector or an interrupt (element 3010). In many embodiments, the SBSP may receive a reset vector that indicates a location of code to execute after a power-on reset or an interrupt to instruct the processors to enter a management mode such as a system management mode (SMM) with the location of code to execute to enter the SMM or other management mode. Thereafter, the SBSP may fetch instructions (element 3015) from the address. The instructions may include assembly code or machine code to execute to facilitate loading SMM code into a cache of the SBSP for execution and/or a compiler and loading routines in a higher-level language into a cache of the SBSP for execution.

While executing the instructions, the SBSP may determine addresses at which to store processor data structures (element 3020). If the reset vector resulted from a power-on reset, the SBSP may allocate a data region in the cache of the SBSP for heap and stack and, in some embodiments, the SBSP may also set up hand-off blocks including processor data structures that include data to initialize the PBSPs. The SBSP may also establish data regions in caches of other PBSPs by modifying the system address map stored in memory type range registers associated with each of the PBSPs. On the other hand, if the reset vector resulted from a system management interrupt, the SBSP may determine an address range for a data region within the SMRAM for storing the processor data structures in SMRAM. Some embodiments establish a data region or at least part of a data region in the main memory if the main memory is initialized.

Once the data region is established, the SBSP may determine a reference data structure (element 3025). In some embodiments, the SBSP may choose a default reference data structure. In other embodiments, the SBSP may choose the reference data structure based on the size of the differences between the reference data structure and data structures for PBSPs in the system.

After determining the reference data structure, the SBSP may store the reference data structure in the data region (element 3030). In some embodiments, the SBSP may store a pointer in a pointer data structure in the data region, store the reference data structure in a different portion of the data region, and store a pointer to the reference data structure in the pointer data structure.

Once the reference data structure is selected, the SBSP may determine a difference between a data structure for a processor and the reference data structure or the data structure for the previous processor (element 3035) and may store the difference in the data region (element 3040). In many embodiments, the difference between a data structure for a processor and the reference data structure may involve subtracting the bit sequence of the reference data structure from the bit sequence of the data structure of the processor to determine a bit sequence of logical ones and zeros that represent each difference in the context or state of the processor data structures. In some embodiments, the SBSP may determine an inter-frame difference rather than determining the difference based on the same reference data structure for each of the processors. For instance, the SBSP may calculate the differences based on the equation: difference(x) equals the data structure for processor(x) minus the data structure for processor(x−1), where x is the processor socket identifier.

The SBSP can store the resulting bit sequence as a linked list of non-zero differences, a bitmap, a bit sequence, or another data structure in the data region (element 3040). In some embodiments, the SBSP compresses the difference prior to storage. Further embodiments store a pointer for the difference in a pointer data structure in the data region and store the difference at the address associated with the pointer in the data region. If there are additional processors in the system (element 3045), the SBSP may repeat elements 3035 and 3040.

FIG. 3B illustrates a flowchart for decompressing the compressed processor data structures. The flowchart begins with determining a reference data structure to decompress a compressed processor data structure (element 3110). In some embodiments, the reference data structure is selected from the group of processor data structures and is the same for each of the compressed data structures. In other embodiments, the reference data structure for decompression is the data structure for the previous processor during the compression process. If the compression process follows the socket identifiers in order from socket 0 to socket n, the reference data structure for decompression is the socket identifier of the processor data structure to decompress minus one. Other embodiments use numbers other than the socket identifiers to determine the order of compression.

In some embodiments, the SBSP retrieves the reference data structure from the data region by retrieving the data structure at the address associated with a pointer for the reference data structure. In other embodiments, the reference data structure is the first data structure stored in the data region. In other embodiments, the SBSP retrieves the reference data structure from HOBs in the CodeRegion of the cache.

After determining the reference data structure, the SBSP may add the compressed data structure to the reference data structure to decompress the compressed data structure (element 3115). In some embodiments, the SBSP adds the difference to the corresponding processor data structure retrieved from a hand-off block stored in the cache. In other embodiments, the SBSP maintains the reference data structure in the data region of cache while decompressing the processor data structure. Furthermore, if there are more processors (element 3120) to decompress, the SBSP may repeat elements 3110 and 3115.

FIGS. 4A-D depict pseudo code of embodiments of memory logic such as the memory logic depicted in FIG. 1A and the functionality performed by the memory logic depicted in FIGS. 1B-D. FIG. 4A is an embodiment of a pseudo code 4000 for compression of processor data structures. Line 1 of the pseudo code 4000 initializes a variable x to zero to represent the processor in socket identifier 0 and a pointer. Line 2 loads the data structure for CPU(0), the CPU in socket identifier 0, into a Frame structure array at Frame(0) and initializes the pointer to the end of a processor data structure. Line 3 initiates a loop with x=1 while CPU(x) is not empty. The loop also increments the value of x by one after each loop. Line 4 reads the data structure for the array element CPU(x) and saves the data structure to Frame(x), which is the data structure for CPU(1) during the first pass through the loop. Line 5 calculates the Frame Delta x, which is the x entry in an array comprising the differences. The Frame Delta x is set equal to the Frame(x) minus the Frame(x−1), which is the data structure for CPU1 minus the data structure for CPU0 in the first pass through the loop.

At line 6, the pseudo code saves the Frame Delta x into an array of delta (x), which is delta(1) during the first pass through the loop. Line 7 describes storage of the delta (x) in a format such as a linked list comprising data and the location of the data or in a bitmap. The location of the data refers to an offset within the CPU(x) data structure. Line 8 copies delta (x) to a pointer size of (delta(x)) to set a pointer at the end of the data structure including the difference, which is the difference between CPU1 and CPU0 during the first pass through the loop. Line 9 moves the current pointer in a pointer structure for the array delta (x) to the end of the array for delta (x) so the next entry in the array can be added without writing over delta (x).

The loop ends at line 10, the loop increments the value of x by one, and the loop repeats if the CPU (x) is not an empty. In other words, the loop repeats if there is another CPU data structure to compress. Otherwise, execution of the pseudo code 4000 terminates.

FIG. 4B is an embodiment of a pseudo code 4100 for decompression of processor data structures compressed as illustrated in FIG. 4A. Line 1 of the pseudo code 4100 initializes a variable x to zero to represent the processor in socket identifier 0 and a frame pointer to the first address in the data structure, which is the data structure for CPU0. Line 2 sets the array element CPU(0) equal to the data structure at the frame pointer. Line 3 initiates a loop with x=1 for as long as frame(x) is not empty and indicates that the variable x will be incremented after each loop.

At line 4, the pseudo code 4100 sets the array element of frame(x) equal to delta(x). The array, delta(x), contains the differences as elements and x=1 during the first pass so delta(x) is delta(1) during the first pass through the loop. The array element, delta(1), is the difference between the data structure for CPU1 and the data structure for CPU0 during the first pass through the loop.

Line 5 decompresses the compress data structure in the array element, frame(x), which is the compressed data structure for CPU1, to delta(x), which is the full bit sequence difference between the CPU1 and CPU0 in the first pass through the loop. Lines 6 and 7 decompress delta(x) to generate the data structure for CPU(x), which is the data structure for CPU1 during the first pass through the loop. Line 8 initializes CPU(x), the processor in socket identifier x, by storing the state or context from the compressed data structure for CPU(x) in the CPU registers, and other. The CPU(x) is the CPU in socket 1 during the first pass through the loop. Line 9 ends the loop so the loop increments the value of x by one and repeats the loop if CPU(x) is not empty. In other words, the loop repeats until there are no compressed data structures available to decompress.

FIG. 4C is an embodiment of a pseudo code 4200 for compression of processor data structures with dynamic memory frame allocation. Line 1 of the pseudo code 4200 initializes a variable x to zero to represent the processor in socket identifier 0. Line 2 sets Ref_Frame to the size of a data structure to allocate space for the structure of CPU0 in the pointer data structure in the data region of cache. Line 3 loads the data structure for CPU(0), the CPU in socket identifier 0, into a Frame structure array at Ref_Frame(0). Line 4 sets a temp_Frame variable to the size of a data structure. Line 5 reads the pointer for compressed CPU data structures and clears an array of frames_pointer. Line 6 initiates a loop while CPU(x) is not empty, which is CPU0 during the first pass through the loop. Line 7 reads the data structure from CPU(x) and saves it to the variable temp_Frame.

At line 8, the pseudo code 4200 sets the array element of Frame Delta (x) equal to the data structure in temp_Frame minus the data structure in Ref_Frame. In line 8, during the first pass through the loop, the pseudo code 4200 subtracts the data structure of CPU0, as the Ref_Frame, from the data structure of CPU0 to create difference structure to save in the data region. If the state of the processor data structure for CPU0 has not changed since setting the Ref_Frame variable, then difference structure will be empty or null because there is no difference at this point.

Line 9 saves non-zero data, which is delta(x). Delta(x) is the uncompressed version of delta(x). Line 10 set an element of the frames_pointer array, frames_pointer(x) to the size of delta(x), which is likely null during the first pass through the loop. In other words, the pseudo code 4200 allocates enough space in the pointer data structure for the pointer, frames_pointer(x), to store the compressed difference between CPUx and the reference data structure copied from CPU0 during execution of this pseudo code 4200. Thereafter, line 11 copies delta(x) to the address at the frames_pointer(x). Line 12 increments x by one and line 12 repeats the loop if CPU(x) comprises a processor data structure and ends the loop otherwise. In other words, the loop repeats until there are no data structures available to compress. Once the loop ends, line 14 deletes the allocation for a variable temp_Frame.

FIG. 4D is an embodiment of a pseudo code 4300 for decompression of processor data structures compressed as illustrated in FIG. 4C. Line 1 of the pseudo code 4300 initializes a variable x to zero to represent the processor in socket identifier 0. Line 2 sets the Ref_Frame variable to the first frame in the data structure, which is a pointer data structure. Line 3 sets allocates to a variable, temp_frame, an amount of cache, SMRAM, or other memory, equal to the size of a data structure. Line 4 reads the number of pointers in the array of frames_pointer and then gets the array of pointers, frames_pointer[ ]. Line 5 initiates a loop while the value of x is less than the number of pointers in the array of pointers, frames_pointer[ ]. Line initiates an IF THEN statement that performs the lines after the If statement if the conditions in the IF statement are met, i.e., if the frame_pointer array is not null or empty. Otherwise all statements between the IF THEN statement and the END IF statement are skipped.

At line 7, the pseudo code 4300 performs the first element within the IF THEN statement. In particular, the pseudo code 4300 reads the compressed difference, delta(x), and decompresses the structure in delta(x) to determine Frame Delta(x), which is the bit sequence difference between CPU0 and the reference data structure, which is CPU0 during the first pass through the loop.

Line 8 sets the variable temp_Frame to the Ref_Frame plus the Frame Delta(x), which stores a data structure in the variable temp_Frame that includes the reference data structure plus the bit sequence that is the difference calculated by subtracting the reference frame from CPU(x) in the pseudo code 4200 described in FIG. 4C. During the first pass through the loop, the line 8 describes adding the data structure for CPU0, which was stored at the start of the compression of the data structures, to the difference between CPU0 and the reference data structure currently stored for CPU0.

Line 9 sets the array element CPU(x) to equal to the variable temp_Frame to store the decompressed data structure in the array element of CPU(x). Line 10 performs an update of the CPU(x) with any data updates since the most recent update, which is updated to CPU(x'). Line 11 is an IF CONTINUE statement that will end the IF from line 6 and, thus skip line 12 if the statement is not true, i.e., CPU(x') equals CPU(x). Line 12 executes if an update is required of the CPU data, which releases the variable array frames_pointer[x] and sets the frames_pointer[x] to null. Line 12 ends the IF THEN at the End IF at line 13 because the frames_pointer[x] is null.

If CPU(x') does not equal CPU(x) then the IF THEN statement skips the deallocation of the frames_pointer(x) data structure for CPU(x) and the subsequent lines 14-17 allocate a new data structure equal to the size of the delta(x'), which is calculated in lines 14 and 15. On the other hand, if CPU(x') does equal CPU(x) the size of the allocation of the new data structure in line 16 is null or zero.

Line 14 sets the Frame Delta (x') equal to the CPU(x') minus the Ref_Frame. Line 15 implements intra-frame compression on the Delta(x') to create delta(x'). For instance, delta(x') may be a linked list of only non-zero values.

Line 16 allocates a new frames_pointer(x) for CPU(x) with a size of delta(x') if delta(x') is not empty or null. Line 17 copies delta(x') into the array element of frames_pointer (x). Line 18 increments the value of x by one and line 19 returns execution to line 5 if the value of x is less than the total number of processors. In other words, the loop repeats until there are no compressed data structures available to decompress. Once the loop ends, line 20 deletes the allocation for a variable temp_Frame to free up the space for other uses.

FIGS. 5A and 5B depict flowcharts of embodiments of memory logic such as the memory logic depicted in FIG. 1A and the functionality performed by the memory logic depicted in FIGS. 1B-D and 3A-B. FIG. 5A describes an embodiment of a process for initializing each of the application processors in a system such as the system 1000 in FIG. 1A. The flowchart begins with receipt of a reset vector (element 5010). The reset vector comprises a location to execute pre-boot code such as BIOS code or UEFI code. Prior to sending the reset vector, the platform is powered on and hardware power sequencing initiates the clocks, stabilizes the power rails, and maintains a reset-line that prevents the PBSPs from attempting to operate. Once the clocks have converged and the power rails are stabilized, the platform may de-assert the reset lines to the PBSPs.

The processors determine their course of action based on their role as an SBSP or a PBSP (element 5015). The SBSP executes the pre-boot code to initialize the main memory and coordinates initialization of the PBSPs. The PBSPs enter a mode to wait-for-SIPI during which each PBSP waits for an interrupt from the SBSP to begin initialization (element 5030).

The SBSP may locate the code at the address indicated by the reset vector and begins to execute the code to initialize the SBSP (element 5020). The SBSP may initialize itself by establishing a data region in the cache and loading data structures for each of the processors into the data region. The memory logic provides functionality to the SBSP to compress the data structures because loading, for example, eight large data structures for eight processors requires a large amount of memory and might, in some embodiments, overflow the heap. The SBSP allocates a heap and a stack within the data region of the cache. The SBSP may store the data structures in the heap and code in the stack.

The SBSP may implement the compression and decompression functionality of the memory logic by storing one complete processor data structure in the heap that may or may not be compressed and storing values for differences or deltas for each of the PBSPs.

The SBSP may wake the PBSPs to copy processor data structures into the caches of the PBSPs (element 5025). In some embodiments, the SBSP decompresses the processor data structures in the data region of the cache of the SBSP and sends a pipe request to a PBSP to instruct the PBSP to store a processor data structure in the PBSP's cache. In the present embodiment, the SBSP sends a pipe request to a PBSP to instruct the PBSP to store a processor data structure in the PBSP's cache during, e.g., the PEI phase, and then either instruct the PB SP to enter the wait-for-SIPI mode again or transmit a SIPI to begin initialization (element 5035). In some embodiments, the memory logic provides functionality to the SBSP to increase the amount of cache available in the data region by storing unique addresses for each of the caches in each of the PBSPs in registers such as the Memory Type Range Registers (MTRRs). In further embodiments, the SBSP may transmit the data structures through inter-processor communications buses or links, such as the point-to-point communication link 1056 in FIG. 1A. If the SBSP transmits compressed data structures to the PBSPs, which reduces inter-processor traffic, the SBSP may instruct the PBSP to decompress the processor data structure prior to instructing the PBSP to initialize.

If there are additional PBSPs in the system (element 5040), the SBSP may repeat the process of sending a pipe request via registers to store the processor data structure in the cache of the PBSP.

FIG. 5B illustrates an embodiment of a process that is functionality of a memory logic, such as the memory logic 1050A, 1050B, 1050C, 1050D, 1050E, and 1050F illustrated in FIG. 1A, to expand the cache available for the data region. The flowchart begins with receiving a reset vector (element 5110). The SBSP receives the reset vector and begins to execute the pre-boot code to initialize a multiple processor package cache (element 5115). To initialize the multiple processor package cache, the SBSP may store unique addresses for each of the caches in each of the PBSPs in registers such as the MTRRs for each of the PBSPs. In many embodiments, the SBSP establishes a memory address range for the data regions in the caches to that are adjacent to one another. In other embodiments, the SBSP does not establish a memory address range for the data regions in the caches to be adjacent.

The SBSP may also store a pointer data structure in the data region of the SBSP's cache and set addresses within pointer data structure for each of the PBSP's caches including a point for the processor data structure for the SBSP in the SBSP's cache. After storing the pointers, the SBSP may transmit a pipe request to each PBSP to instruct the PBSPs to load their respective processor data structures from the BIOS, UEFI, firmware, or flash memory and a pipe request or a start-up inter-processor interrupt to instruct the PBSPs to begin initialization. In some embodiments, the instruction from the SBSP to the PBSP includes pipe request with an address for code for the PBSP to execute to obtain the processor data structure and to begin initialization. In several embodiments, the SBSP determines the timing for instructing the PBSPs by, e.g., staggering the pipe requests or interrupts to each PBSP by a delay period that is determined to avoid bus conflicts.

During initialization of the SBSP (element 5120) and one or more of the PBSPs (element 5125), the SBSP may pass global configuration data to the PBSPs through point-to-point communication links, a bus, or registers to facilitate initialization of the PBSPs. In some embodiments, the processor data structures are dynamic and the SBSP performs updates to the data structures in one or more of the PBSPs prior to the one or more PBSPs starting the initialization process. In such embodiments, the SBSP instructs the PBSP to halt operations and enter the wait-for-SIPI mode again after saving the processor data structure in the data region in the PBSP's cache. Once the SBSP determines the updates for the processor data structure, the SBSP may instruct the PBSP to execute code to perform the update to the processor data structure in the data region in the PBSP's cache and may instruct the PBSP to start initialization.

Figure 6:
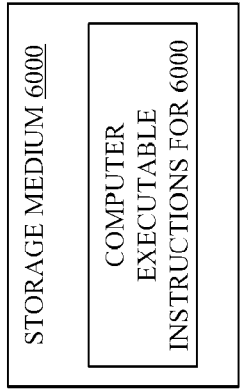
FIGS. 6-7 depict embodiments a storage medium and a computing platform that include a memory logic such as the memory logic described in conjunction with each of the embodiments illustrated herein.

FIG. 6 illustrates an example of a storage medium 6000 to store processor data structures. Storage medium 6000 may comprise an article of manufacture. In some examples, storage medium 6000 may include any non-transitory computer readable medium or machine readable medium, such as an optical, magnetic or semiconductor storage. Storage medium 6000 may store various types of computer executable instructions, such as instructions to implement logic flows and/or techniques described herein. Examples of a computer readable or machine readable storage medium may include any tangible media capable of storing electronic data, including volatile memory or nonvolatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 7:
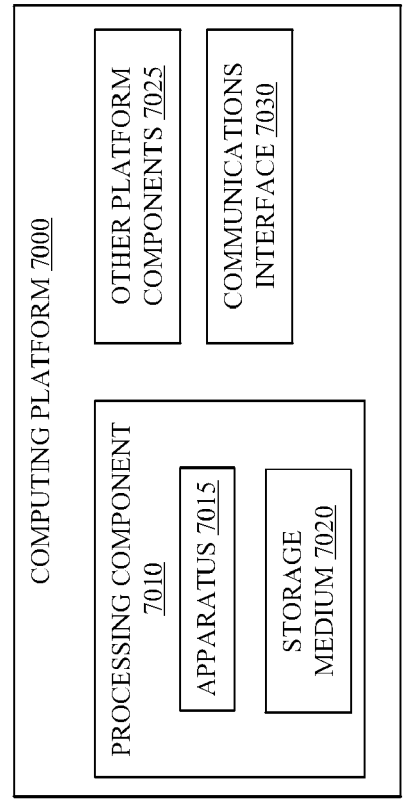

FIG. 7 illustrates an example computing platform 7000. In some examples, as shown in FIG. 7, computing platform 7000 may include a processing component 7010, other platform components or a communications interface 7030. According to some examples, computing platform 7000 may be implemented in a computing device such as a server in a system such as a data center or server farm that supports a manager or controller for managing configurable computing resources as mentioned above. Furthermore, the communications interface 7030 may comprise a wake-up radio (WUR) or wake-up receiver (WURx) and may be capable of waking up a main radio of the computing platform 7000.

According to some examples, processing component 7010 may execute processing operations or logic for apparatus described herein. Processing component 7010 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 7025 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EE-PROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory), solid state drives (SSD) and any other type of storage media suitable for storing information.

In some examples, communications interface 7030 may include logic and/or features to support a communication interface. For these examples, communications interface 7030 may include one or more communication interfaces that operate according to various communication protocols or standards to communicate over direct or network communication links. Direct communications may occur via use of communication protocols or standards described in one or more industry standards (including progenies and variants) such as those associated with the PCI Express specification. Network communications may occur via use of communication protocols or standards such those described in one or more Ethernet standards promulgated by the Institute of Electrical and Electronics Engineers (IEEE). For example, one such Ethernet standard may include IEEE 802.3-2012, Carrier sense Multiple access with Collision Detection (CSMA/CD) Access Method and Physical Layer Specifications, Published in December 2012 (hereinafter "IEEE 802.3"). Network communication may also occur according to one or more OpenFlow specifications such as the OpenFlow Hardware Abstraction API Specification. Network communications may also occur according to Infiniband Architecture Specification, Volume 1, Release 1.3, published in March 2015 ("the Infiniband Architecture specification").

Computing platform 7000 may be part of a computing device that may be, for example, a server, a server array or server farm, a web server, a network server, an Internet server, a work station, a mini-computer, a main frame computer, a supercomputer, a network appliance, a web appliance, a distributed computing system, multiprocessor systems, processor-based systems, or combination thereof. Accordingly, functions and/or specific configurations of computing platform 7000 described herein, may be included or omitted in various embodiments of computing platform 7000, as suitably desired.

The components and features of computing platform 7000 may be implemented using any combination of discrete circuitry, ASICs, logic gates and/or single chip architectures. Further, the features of computing platform 7000 may be implemented using microcontrollers, programmable logic arrays and/or microprocessors or any combination of the foregoing where suitably appropriate. It is noted that hardware, firmware and/or software elements may be collectively or individually referred to herein as "logic".

It should be appreciated that the exemplary computing platform 7000 shown in the block diagram of FIG. 7 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or nonvolatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code to reduce the number of times code must be retrieved from bulk storage during execution. The term "code" covers a broad range of software components and constructs, including applications, drivers, processes, routines, methods, modules, firmware, microcode, and subprograms. Thus, the term "code" may be used to refer to any collection of instructions which, when executed by a processing system, perform a desired operation or operations.

Logic circuitry, devices, and interfaces herein described may perform functions implemented in hardware and also implemented with code executed on one or more processors. Logic circuitry refers to the hardware or the hardware and code that implements one or more logical functions. Circuitry is hardware and may refer to one or more circuits. Each circuit may perform a particular function. A circuit of the circuitry may comprise discrete electrical components interconnected with one or more conductors, an integrated circuit, a chip package, a chip set, memory, or the like. Integrated circuits include circuits created on a substrate such as a silicon wafer and may comprise components. And integrated circuits, processor packages, chip packages, and chipsets may comprise one or more processors.

Processors may receive signals such as instructions and/or data at the input(s) and process the signals to generate the at least one output. While executing code, the code changes the physical states and characteristics of transistors that make up a processor pipeline. The physical states of the transistors translate into logical bits of ones and zeros stored in registers within the processor. The processor can transfer the physical states of the transistors into registers and transfer the physical states of the transistors to another storage medium.

A processor may comprise circuits to perform one or more sub-functions implemented to perform the overall function of the processor. One example of a processor is a state machine or an application-specific integrated circuit (ASIC) that includes at least one input and at least one output. A state machine may manipulate the at least one input to generate the at least one output by performing a predetermined series of serial and/or parallel manipulations or transformations on the at least one input.

The logic as described above may be part of the design for an integrated circuit chip. The chip design is created in a graphical computer programming language, and stored in a computer storage medium or data storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication.

The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a processor board, a server platform, or a motherboard, or (b) an end product.

Several embodiments have one or more potentially advantages effects. For instance, implementing the functionality of the memory logic to determine a reference data structure, determine a difference between a second processor and the reference data structure, and store the difference advantageously reduces space requirements for storage of processor data structures in cache. Implementing the functionality of the memory logic partially as code and partially as logic circuitry, may advantageously improve the speed and efficiency of functionality implemented in logic circuitry and advantageously offer an ability to update or modify functionality implemented as code in nonvolatile memory like flash memory. Implementing the memory logic to store a pointer data structure for each of the PBSPs that includes an address for the location of a difference between the data structure and the reference data structure can advantageously implement changes to any one of the processors' data structures without affecting the data structure of any of the other processors. Implementing the memory logic to instruct each package bootstrap processor to store a processor data structure in each package bootstrap processor's own cache advantageously increases the cache available to store data in the pre-OS environment. Implementing the memory logic to instruct each package bootstrap processor to store a compressed processor data structure in each package bootstrap processor's own cache advantageously increases the cache available to store data in the pre-OS environment and advantageously decreases the amount of space in cache that is occupied by the processor data structure. Implementing the memory logic to instruct each package bootstrap processor to perform initialization based on the processor data structure stored in the package bootstrap processor's own cache can advantageously reduce traffic on the inter-processor interconnect.

EXAMPLES OF FURTHER EMBODIMENTS

The following examples pertain to further embodiments. Specifics in the examples may be used anywhere in one or more embodiments.

Example 1 is an apparatus to store computer processor data structures in computer memory, the apparatus comprising a first processor, of two or more processors, comprising at least one processor core and a cache to implement a memory logic, wherein the memory logic is configured to: allocate a data region in the memory to store the data structures for the two or more processors; determine a reference data structure for at least one of the two or more processors; store the reference data structure in the data region; determine a difference between the reference data structure and a data structure for a second processor of the two or more processors; and store the difference between the reference data structure and the data structure for the second processor in the data region. In Example 2, the apparatus of Example 1, wherein the memory logic comprises a code to execute on a core of the first processor in a Pre-Extensible Firmware Interface (EFI) Initialization Environment (PEI) of platform initialization, a Driver Execution Environment (DXE) phase of platform initialization, or in a System Management Mode (SMM). In Example 3, the apparatus of Example 1, wherein the memory logic is further configured to add the difference to the reference data structure to decompress the data structure for the second processor, to instruct the second processor to store the data structure for the second processor, and to instruct the second processor to initialize based on the data structure for the second processor. In Example 4, the apparatus of Example 1, wherein the memory logic comprises part of at least one of a Unified Extensible Firmware Interface (UEFI) firmware, a Basic Input Output System (BIOS) code, a Firmware Support Package code, a System Management Mode (SMM) code, other non-x86 pre-boot code, and other x86 pre-boot code. In Example 5, the apparatus of Example 1, wherein the memory logic comprises logic circuitry, the logic circuitry coupled with the processor core in the first processor. In Example 6, the apparatus of Example 1, wherein the memory logic comprises code in read only memory (ROM), the ROM coupled with the processor core in the first processor.

In Example 7, the apparatus of Example 1, wherein the data region resides at least in the cache of the first processor, wherein the cache is physically located in the first processor. In Example 8, the apparatus of Example 1, wherein the memory logic is configured to store a data structure for a pointer comprising an address associated with the reference data structure in the data region and storing a data structure for a pointer comprising an address associated with the difference between the reference data structure and the data structure for the second processor in the data region. In Example 9, the apparatus of Example 1, wherein the memory logic is configured to determine a difference between a data structure for a third processor of the two or more processors and the data structure for the second processor. In Example 10, the apparatus of Example 1, wherein the memory logic is configured to determine a difference between a data structure for a third processor of the two or more processors and the reference data structure. In Example 11, the apparatus of Example 1, wherein the memory logic is configured to determine the data structure for the second processor based on the reference data structure and on the difference between the reference data structure and the data structure for the second processor. In Example 12, the apparatus of Example 1, wherein the memory logic is configured to select the reference data structure from a group of data structures for each of the two or more processors based on a size of differences between the reference data structure and data structures of each of the two or more processors.

In Example 13, the apparatus of Example 1, wherein the reference data structure comprises a data structure for the first processor. In Example 14, the apparatus of Example 1, wherein allocation of the data region in the cache comprises allocation of the data region in the cache after a power-on reset and prior to performing memory detection. In Example 15, the apparatus of Example 1, wherein allocation of the data region in the cache comprises identification of memory ranges within the cache as heap and stack in one or more registers. In Example 16, the apparatus of Example 1, wherein allocation of the data region in the cache comprises allocation of the data region in the cache of the first processor and further comprising storage of a bit in a register to place the memory range in a no eviction mode. In Example 17, the apparatus of Example 1, wherein allocation of the data region in the cache comprises allocation of the data region in the cache of the first processor and allocation of the data region in the cache of the second processor and further comprising modification of addresses in one or more registers to associate a unique range of addresses with the data region in the second processor. In Example 18, the apparatus of Example 17, wherein modification of addresses in one or more registers to associate the unique range of addresses with the data region in the second processor comprises assignment of addresses to the data region in the second processor that are adjacent to the addresses assigned to the data region in the first processor.

In Example 19, the apparatus of Example 17, wherein determination of the reference data structure comprises identification of a data structure for the first processor as the reference data structure. In Example 20, the apparatus of Example 1, wherein determination of the reference data structure comprises identification of a data structure for the first processor as the reference data structure. In Example 21, the apparatus of Example 20, wherein storage of the reference data structure in the data region comprises storage of the data structure for the first processor in the data region in the cache physically located in the first processor. In Example 22, the apparatus of Example 21, wherein storage of the difference between the reference data structure and the data structure for the second processor in the data region comprises storage of the difference at an address of the data region in the cache physically located in the first processor. In Example 23, the apparatus of Example 21, wherein storage of the difference between the reference data structure and the data structure for the second processor in the data region comprises storage of a data structure for a pointer in the cache physically located in the first processor, wherein the pointer is associated with an address or address offset in the data region in a cache physically located in the second processor, and storage of the difference in the cache physically located in the second processor at the address. In Example 24, the apparatus of Example 1, wherein determination of the difference between the reference data structure and the data structure for the second processor comprises compression of the data structure for the second processor by generation of a compressed data structure comprising the difference. In Example 25, the apparatus of Example 24, wherein compression of the data structure for the at least one processor comprises generation of a linked list of one or more bits in the data region to indicate each non-zero difference between bits in the reference data structure and bits in the data structure for the second processor, wherein each entry in the linked list comprises an offset value to indicate a location within the data structure and a delta value to indicate one or more bits that are different from corresponding bits in the reference data structure.

In Example 26, the apparatus of Example 24, wherein compression of the data structure for the at least one processor comprises generation of a bitmap of one or more bits in the data region that indicates each non-zero difference between bits in the reference data structure and bits in the data structure for the second processor. In Example 27, the apparatus of Example 1, further comprising a second set of two or more processors to be initialized during a Driver Execution Environment (DXE) phase of platform initialization, the memory logic being configured to compress a data structure for the second set of two or more processors; and to store the data structure in memory, wherein compression of the data structure for one processor of the second set of two or more processors comprises storage of a reference data structure in the memory; determination of a difference between the data structure for the one processor of the second set of two or more processors and the reference data structure; and storage of the difference between the data structure for the one processor of the second set of two or more processors and the reference data structure in the memory. In Example 28, system to store computer processor data structures in computer memory, the system comprising dynamic random access memory coupled with the two or more processors in accordance with any one o Examples 1-27.

Example 29 is a method to store computer processor data structures in computer memory, the method comprising allocating, by a first processor of two or more processors, a data region in a memory to store the data structures for the two or more processors; determining, by the first processor, a reference data structure for at least one of the two or more processors; storing, by the first processor, the reference data structure in the data region; determining, by the first processor, a difference between the reference data structure and a data structure for a second processor of the two or more processors; and storing, by the first processor, the difference between the reference data structure and the data structure for the second processor in the data region. In Example 30, the method of Example 29, further comprising adding the reference data structure to the difference to decompress the data structure for the second processor and instructing the second processor to initialize based on the data structure. In Example 31, the method of Example 29, further comprising storing, by the first processor, a data structure for a pointer comprising an address associated with the reference data structure in the data region and storing a data structure for a pointer comprising an address associated with the difference between the reference data structure and the data structure for the second processor in the data region. In Example 32, the method of Example 29, further comprising determining a difference between a data structure for a third processor of the two or more processors and the data structure for the second processor.

In Example 33, the method of Example 29, further comprising determining a difference between a data structure for a third processor of the two or more processors and the reference data structure. In Example 34, the method of Example 29, further comprising determining the data structure for the second processor based on the reference data structure and on the difference between the reference data structure and the data structure for the second processor. In Example 35, the method of Example 29, wherein the memory comprises a cache physically located in the first processor. In Example 36, the method of Example 29, further comprising selecting the reference data structure from a group of data structures for each of the two or more processors based on a size of differences between the reference data structure and data structures of each of the two or more processors. In Example 37, the method of Example 29, wherein the reference data structure comprises a data structure for the first processor.

In Example 38, the method of Example 29, wherein allocating the data region in the cache comprises allocating the data region in the cache after a power-on reset and prior to performing memory detection. In Example 39, the method of Example 29, wherein allocating the data region in the cache comprises allocating the data region in the cache during a Pre-Extensible Firmware Interface (EFI) Initialization Environment (PEI), during a Driver Execution Environment, or during a System Management Mode (SMM). In Example 40, the method of Example 29, wherein allocating the data region in the cache comprises setting a memory range within the cache for the data region. In Example 41, the method of Example 40, wherein allocating the data region in the cache comprises allocating the data region in the cache of the first processor and further comprising storing a setting in a register to place the memory range in a no eviction mode. In Example 42, the method of Example 40, wherein allocating the data region in the cache comprises allocating the data region in the cache of the first processor and allocating the data region in the cache of the second processor and further comprising modifying addresses in a register to associate a unique range of addresses with the data region in the second processor. In Example 43, the method of Example 42, wherein modifying addresses in a register to associate the unique range of addresses with the data region in the second processor comprises assigning addresses to the data region in the second processor that are adjacent to the addresses assigned to the data region in the first processor.

In Example 44, the method of Example 29, wherein determining the reference data structure comprises identifying a data structure for the first processor as the reference data structure. In Example 45, the method of Example 44, wherein storing the reference data structure in the data region comprises storing the data structure for the first processor in the data region in the cache physically located in the first processor. In Example 46, the method of Example 45, wherein storing the difference between the reference data structure and the data structure for the second processor in the data region comprises storing the difference at an address of the data region in the cache physically located in the first processor. In Example 47, the method of Example 45, wherein storing the difference between the reference data structure and the data structure for the second processor in the data region comprises storing a data structure for a pointer in the cache physically located in the first processor, wherein the pointer is associated with an address in the data region in the cache physically located in the second processor, and storing the difference in the cache at the address. In Example 48, the method of Example 29, wherein determining the difference between the reference data structure and the data structure for the second processor comprises compressing the data structure for the second processor by generating a compressed data structure comprising the difference. In Example 50, the method of Example 48, wherein compressing the data structure for the at least one processor comprises generating a linked list of one or more bits in the data region to indicate each non-zero difference between bits in the reference data structure and bits in the data structure for the second processor, wherein each entry in the linked list comprises an offset value to indicate a location within the data structure and a delta value to indicate one or more bits that are different from corresponding bits in the reference data structure.

In Example 51, the method of Example 48, wherein compressing the data structure for the at least one processor comprises generating a bitmap of one or more bits in the data region that indicates each non-zero difference between bits in the reference data structure and bits in the data structure for the second processor. In Example 52, a computer readable medium having stored thereon instructions that when executed cause a computer to perform operations comprising the operations of any one of Examples 29-51. In Example 53, an apparatus to store data structures in memory, the system comprising a means for performing any one of Examples 29-51. In Example 54, a program for causing a computer to perform operations comprising operations of any one of Examples 29-51. In Example 55, a computer-readable storage medium for storing the program of Example 54.

Example 56 is a to store computer processor data structures in computer memory, the system comprising a memory comprising a dynamic random access memory; a first processor, of two or more processors, comprising at least one processor core and a cache to implement a memory logic, wherein the memory logic is configured to: allocate a data region in the memory to store the data structures for the two or more processors; determine a reference data structure for at least one of the two or more processors; store the reference data structure in the data region; determine a difference between the reference data structure and a data structure for a second processor of the two or more processors; and store the difference between the reference data structure and the data structure for the second processor in the data region. In Example 57, the system of Example 56, wherein the memory comprises a cache physically located in the first processor. In Example 58, the system of Example 56, wherein the memory logic comprises a code to execute on a core of the first processor in a Pre-Extensible Firmware Interface (EFI) Initialization Environment (PEI) of platform initialization, a Driver Execution Environment (DXE) phase of platform initialization, or in a System Management Mode (SMM).

In Example 59, the system of Example 58, wherein the code comprises part of at least one of a Unified Extensible Firmware Interface (UEFI) firmware, a Basic Input Output System (BIOS) code, a Firmware Support Package code, a System Management Mode (SMM) code, other non-x86 pre-boot code, and other x86 pre-boot code. In Example 60, the system of Example 56, wherein the memory logic comprises logic circuitry, the logic circuitry coupled with a processor core in the first processor. In Example 61, the system of Example 56, wherein the memory logic comprises code in read only memory (ROM), the ROM coupled with a processor core in the first processor. In Example 62, the system of Example 56, wherein the memory logic is configured to store a data structure for a pointer comprising an address or address offset associated with the reference data structure in the data region and storing a data structure for a pointer comprising an address or address offset associated with the difference between the reference data structure and the data structure for the second processor in the data region. In Example 63, the system of Example 56, wherein the memory logic is configured to determine a difference between a data structure for a third processor of the two or more processors and the data structure for the second processor. In Example 64, the system of Example 56, wherein the memory logic is configured to determine a difference between a data structure for a third processor of the two or more processors and the reference data structure. In Example 65, the system of Example 56, wherein the memory logic is further configured to add the difference to the reference data structure to decompress the data structure for the second processor, to instruct the second processor to store the data structure for the second processor, and to instruct the second processor to initialize based on the data structure for the second processor. In Example 66, the system of Example 56, wherein the memory logic is configured to select the reference data structure from a group of data structures for each of the two or more processors based on a size of differences between the reference data structure and data structures of each of the two or more processors.

In Example 67, the system of Example 56, wherein the reference data structure comprises a data structure for the first processor. In Example 68, the system of Example 56, wherein allocation of the data region in the memory comprises allocation of the data region in a cache coupled physically located in the first processor after a power-on reset and prior to performing memory detection. In Example 69, the system of Example 68, wherein allocation of the data region in the cache comprises identification of a memory range within the cache as the data region in one or more registers. In Example 70, the system of Example 68, wherein allocation of the data region in the cache comprises allocation of the data region in the cache of the first processor and further comprising storage of a bit in a register to place the memory range in a no eviction mode. In Example 71, the system of Example 68, wherein allocation of the data region in the cache comprises allocation of the data region in the cache of the first processor and allocation of the data region in a cache of the second processor and further comprising modification of addresses in one or more registers to associate a unique range of addresses with the data region in the second processor. In Example 72, the system of Example 71, wherein modification of addresses in one or more registers to associate the unique range of addresses with the data region in the second processor comprises assignment of addresses to the data region in the second processor that are adjacent to the addresses assigned to the data region in the first processor. In Example 73, the system of Example 71, wherein determination of the reference data structure comprises identification of a data structure for the first processor as the reference data structure. In Example 74, the system of Example 56, wherein determination of the reference data structure comprises identification of a data structure for the second processor's hardware default settings as the reference data structure. In Example 75, the system of Example 56, wherein storage of the reference data structure in the data region comprises storage of the data structure for the first processor in the data region in the cache physically located in the first processor. In Example 76, the system of Example 75, wherein storage of the difference between the reference data structure and the data structure for the second processor in the data region comprises storage of the difference at an address of the data region in the cache physically located in the first processor.

In Example 77, the system of Example 75, wherein storage of the difference between the reference data structure and the data structure for the second processor in the data region comprises storage of a data structure for a pointer in the cache physically located in the first processor, wherein the pointer is associated with an address or address offset in the data region in the cache physically located in the second processor, and storage of the difference in the cache at the address. In Example 78, the system of Example 56, wherein determination of the difference between the reference data structure and the data structure for the second processor comprises compression of the data structure for the second processor by generation of a compressed data structure comprising the difference. In Example 79, the system of Example 78, wherein compression of the data structure for the at least one processor comprises generation of a linked list of one or more bits in the data region to indicate each non-zero difference between bits in the reference data structure and bits in the data structure for the second processor, wherein each entry in the linked list comprises an offset value to indicate a location within the data structure and a delta value to indicate one or more bits that are different from corresponding bits in the reference data structure. In Example 80, the system of Example 78, wherein compression of the data structure for the at least one processor comprises generation of a bitmap of one or more bits in the data region that indicates each non-zero difference between bits in the reference data structure and bits in the data structure for the second processor.

Example 81 is a non-transitory machine-readable medium containing instructions, which when executed by a first processor of two or more processors, cause the first processor to perform operations, the operations comprising allocating a data region in a memory to store the data structures for the two or more processors; determining a reference data structure for at least one of the two or more processors; storing the reference data structure in the data region; determining a difference between the reference data structure and a data structure for a second processor of the two or more processors; and storing the difference between the reference data structure and the data structure for the second processor in the data region. In Example 82, the machine-readable medium of Example 81, wherein the operations further comprise storing, by the first processor, a data structure for a pointer comprising an address or address offset associated with the reference data structure in the data region and storing a data structure for a pointer comprising an address or address offset associated with the difference between the reference data structure and the data structure for the second processor in the data region.

In Example 83, the machine-readable medium of Example 81, wherein the operations further comprise determining a difference between a data structure for a third processor of the two or more processors and the data structure for the second processor. In Example 84, the machine-readable medium of Example 81, wherein the operations further comprise determining a difference between a data structure for a third processor of the two or more processors and the reference data structure.

In Example 85, the machine-readable medium of Example 81, wherein the operations further comprise determining the data structure for the second processor based on the reference data structure and on the difference between the reference data structure and the data structure for the second processor. In Example 86, the machine-readable medium of Example 81, wherein the memory comprises a cache physically located in the first processor. In Example 87, the machine-readable medium of Example 81, wherein the operations further comprise selecting the reference data structure from a group of data structures for each of the two or more processors based on a size of differences between the reference data structure and data structures of each of the two or more processors.

In Example 88, the machine-readable medium of Example 81, wherein the reference data structure comprises a data structure for the first processor. In Example 89, the machine-readable medium of Example 81, wherein allocating the data region in the memory comprises allocating the data region in a cache after a power-on reset and prior to performing memory detection. In Example 90, the machine-readable medium of Example 81, wherein allocating the data region in the memory comprises allocating the data region in a cache during a Pre-Extensible Firmware Interface (EFI) Initialization Environment (PEI), during a Driver Execution Environment, or during a System Management Mode (SMM). In Example 91, the machine-readable medium of Example 81, wherein allocating the data region in the memory comprises setting a memory range within a cache for the data region. In Example 92, the machine-readable medium of Example 91, wherein allocating the data region in the cache comprises allocating the data region in the cache of the first processor and further comprising storing a setting in a register to place the memory range in a no eviction mode. In Example 93, the machine-readable medium of Example 91, wherein allocating the data region in the cache comprises allocating the data region in the cache of the first processor and allocating the data region in a cache of the second processor and further comprising modifying addresses in a register to associate a unique range of addresses with the data region in the second processor. In Example 94, the machine-readable medium of Example 93, wherein modifying addresses in a register to associate the unique range of addresses with the data region in the second processor comprises assigning addresses to the data region in the second processor that are adjacent to the addresses assigned to the data region in the first processor.

In Example 95, the machine-readable medium of Example 81, wherein determining the reference data structure comprises identifying a data structure for the first processor as the reference data structure. In Example 96, the machine-readable medium of Example 95, wherein storing the reference data structure in the data region comprises storing the data structure for the first processor in the data region in a cache physically located in the first processor. In Example 97, the machine-readable medium of Example 96, wherein storing the difference between the reference data structure and the data structure for the second processor in the data region comprises storing the difference at an address of the data region in the cache physically located in the first processor.

In Example 98, the machine-readable medium of Example 96, wherein storing the difference between the reference data structure and the data structure for the second processor in the data region comprises storing a data structure for a pointer in the cache physically located in the first processor, wherein the pointer is associated with an address or address offset in the data region in a cache physically located in the second processor, and storing the difference in the cache at the address. In Example 99, the machine-readable medium of Example 81, wherein determining the difference between the reference data structure and the data structure for the second processor comprises compressing the data structure for the second processor by generating a compressed data structure comprising the difference. In Example 100, the machine-readable medium of Example 99, wherein compressing the data structure for the at least one processor comprises generating a linked list of one or more bits in the data region to indicate each non-zero difference between bits in the reference data structure and bits in the data structure for the second processor, wherein each entry in the linked list comprises an offset value to indicate a location within the data structure and a delta value to indicate one or more bits that are different from corresponding bits in the reference data structure. In Example 101, the machine-readable medium of Example 99, wherein compressing the data structure for the at least one processor comprises generating a bitmap of one or more bits in the data region that indicates each non-zero difference between bits in the reference data structure and bits in the data structure for the second processor.

Example 102 is an apparatus to store computer processor data structures in computer memory, the apparatus comprising a means for allocating, by a first processor of two or more processors, a data region in a memory to store the data structures for the two or more processors; a means for determining, by the first processor, a reference data structure for at least one of the two or more processors; a means for storing, by the first processor, the reference data structure in the data region; a means for determining, by the first processor, a difference between the reference data structure and a data structure for a second processor of the two or more processors; and a means for storing, by the first processor, the difference between the reference data structure and the data structure for the second processor in the data region. In Example 103, the apparatus of Example 1, further comprising a means for storing a data structure for a pointer comprising an address or address offset associated with the reference data structure in the data region and storing a data structure for a pointer comprising an address or address offset associated with the difference between the reference data structure and the data structure for the second processor in the data region. In Example 104, the apparatus of Example 102, further comprising a means for determining a difference between a data structure for a third processor of the two or more processors and the data structure for the second processor. In Example 105, the apparatus of Example 102, further comprising a means for determining a difference between a data structure for a third processor of the two or more processors and the reference data structure.

In Example 106, the apparatus of Example 102, further comprising a means for adding the difference to the reference data structure to decompress the data structure for the second processor, a means for instructing the second processor to store the data structure for the second processor, and a means for instructing the second processor to initialize based on the data structure for the second processor. In Example 107, the apparatus of Example 102, wherein the memory comprises a cache physically located in the first processor. In Example 108, the apparatus of Example 102, further comprising a means for selecting the reference data structure from a group of data structures for each of the two or more processors based on a size of differences between the reference data structure and data structures of each of the two or more processors. In Example 109, the apparatus of Example 102, wherein the reference data structure comprises a data structure for the first processor. In Example 110, the apparatus of Example 102, wherein the means for allocating the data region in the memory comprises a means for allocating the data region in a cache after a power-on reset and prior to performing memory detection. In Example 111, the apparatus of Example 102, wherein the means for allocating the data region in the memory comprises a means for allocating the data region in a cache during a Pre-Extensible Firmware Interface (EFI) Initialization Environment (PEI), during a Driver Execution Environment, or during a System Management Mode (SMM).

In Example 112, the apparatus of Example 102, wherein the means for allocating the data region in the cache comprises a means for setting a memory range within the cache for the data region. In Example 113, the apparatus of Example 112, wherein the means for allocating the data region in the cache comprises a means for allocating the data region in the cache of the first processor and further comprising a means for storing a setting in a register to place the memory range in a no eviction mode. In Example 114, the apparatus of Example 112, wherein the means for allocating the data region in the cache comprises a means for allocating the data region in the cache of the first processor and a means for allocating the data region in a cache of the second processor and further comprising a means for modifying addresses in a register to associate a unique range of addresses with the data region in the second processor. In Example 115, the apparatus of Example 114, wherein the means for modifying addresses in a register to associate the unique range of addresses with the data region in the second processor comprises a means for assigning addresses to the data region in the second processor that are adjacent to the addresses assigned to the data region in the first processor. In Example 116, the apparatus of Example 102, wherein the means for determining the reference data structure comprises a means for identifying a data structure for the first processor as the reference data structure. In Example 117, the apparatus of Example 116, wherein the means for storing the reference data structure in the data region comprises a means for storing the data structure for the first processor in the data region in a cache physically located in the first processor.

In Example 118, the apparatus of Example 117, wherein the means for storing the difference between the reference data structure and the data structure for the second processor in the data region comprises a means for storing the difference at an address of the data region in the cache physically located in the first processor. In Example 119, the apparatus of Example 117, wherein the means for storing the difference between the reference data structure and the data structure for the second processor in the data region comprises a means for storing a data structure for a pointer in the cache physically located in the first processor, wherein the pointer is associated with an address or address offset in the data region in a cache physically located in the second processor, and storing the difference in the cache physically located in the second processor at the address. In Example 120, the apparatus of Example 102, wherein the means for determining the difference between the reference data structure and the data structure for the second processor comprises a means for compressing the data structure for the second processor by generating a compressed data structure comprising the difference. In Example 121, the apparatus of Example 120, wherein the means for compressing the data structure for the at least one processor comprises a means for generating a linked list of one or more bits in the data region to indicate each non-zero difference between bits in the reference data structure and bits in the data structure for the second processor, wherein each entry in the linked list comprises an offset value to indicate a location within the data structure and a delta value to indicate one or more bits that are different from corresponding bits in the reference data structure. In Example 122, the apparatus of Example 120, wherein the means for compressing the data structure for the at least one processor comprises a means for generating a bitmap of one or more bits in the data region that indicates each non-zero difference between bits in the reference data structure and bits in the data structure for the second processor.

Example 123 is an apparatus to initialize computer processors in cache memory, the apparatus comprising a first processor of two or more processors, the first processor comprising a memory logic configured to: allocate a data region in a cache to store the data structures for the two or more processors, wherein the cache is physically located in the first processor and in a second processor; store a first processor data structure for the first processor in the cache of the first processor; instruct the second processor to store a second processor data structure for the second processor in the cache of the second processor; and instruct the second processor to initialize the second processor with the second processor data structure stored in the cache of the second processor. In Example 124, the apparatus of Example 122, further comprising a memory coupled with the first processor, the memory comprising the memory logic, wherein the memory logic comprises a code to execute on a core of the first processor in a Pre-Extensible Firmware Interface (EFI) Initialization Environment (PEI) of platform initialization or a Driver Execution Environment (DXE) phase of platform initialization. In Example 125, the apparatus of Example 122, wherein the memory logic comprises part of at least one of a Unified Extensible Firmware Interface (UEFI) firmware, a Basic Input Output System (BIOS) code, a Firmware Support Package code, a System Management Mode (SMM) code, other non-x86 pre-boot code, and other x86 pre-boot code. In Example 126, the apparatus of Example 122, wherein the memory logic comprises logic circuitry, the logic circuitry coupled with the processor core in the first processor. In Example 127, the apparatus of Example 122, wherein the memory logic comprises data sync logic to synchronize global configuration data with the second processor. In Example 128, the apparatus of Example 122, wherein the memory logic comprises address setting logic to modify addresses in one or more registers to associate a unique range of addresses with the data region in the second processor and address decoding logic to decode addresses to access the cache in the second processor. In Example 129, the apparatus of Example 122, further comprising a system management random access memory (SMRAM), the memory logic to generate data structures for processor states for each of the two or more processors; to compress at least one of the data structures for processor states for at least one of the two or more processors; and to store the at least one of the data structures for the two or more processors in SMRAM, wherein compression of the data structures for processor states for at least one of the two or more processors comprises storage of a data structure for a reference processor state in the SMRAM; determination of a difference between a data structure for a second processor state for the second processor and the reference processor state; and storage of the difference between the data structure for a second processor state for the second processor and the data structure for the reference processor state in the SMRAM.

In Example 130, the apparatus of Example 122, further comprising a second set of two or more processors to be initialized during a Driver Execution Environment (DXE) phase of platform initialization, the memory logic being configured to compress a data structure for one processor of the second set of two or more processors; and to store the data structure in memory, wherein compression of the data structure for the one processor of the second set of two or more processors comprises storage of a reference data structure in the data region; determination of a difference between the data structure for the one processor and the reference data structure; and storage of the difference between the data structure for the one processor and the reference data structure in the memory. In Example 131, a system to initialize computer processors in cache memory, the system comprising a memory comprising a dynamic random access memory coupled with the two or more processors in accordance with any one of Examples 122-130.

Example 132 is method to initialize computer processors in cache memory, the method comprising allocating, by a first processor of two or more processors, a data region in a cache to store the data structures for the two or more processors, wherein the cache comprises a cache physically located in the first processor and a cache physically located in a second processor; instructing, by the first processor, the second processor to store a second processor data structure for the second processor in the cache of the second processor; and instructing, by the first processor, the second processor to initialize the second processor with the second processor data structure stored in the cache of the second processor. In Example 133, the method of Example 122, further comprising modifying, by the first processor, addresses in one or more registers to associate a unique range of addresses with the data region in the second processor; and decoding, by the first processor, addresses to access the cache in the second processor. In Example 134, the method of Example 122, further comprising storing, by the first processor, a data structure for a pointer comprising an address or address offset associated with the second processor data structure in the data region of the cache physically located in the first processor. In Example 135, the method of Example 122, further comprising generating data structures for processor states for each of the two or more processors; compressing the data structures for the processor states for at least one of the two or more processors; and storing at least one compressed processor state for the two or more processors in system management random access memory (SMRAM), wherein compressing the data structures for the processor states for at least one of the two or more processors comprises storing a data structure for a reference processor state in the SMRAM; determining a difference between a data structure for a second processor state for the second processor and the reference processor state; and storing the difference between the data structure for a second processor state for the second processor and the data structure for the reference processor state in the SMRAM. In Example 135, the method of Example 136, further comprising selecting the reference processor state from a group of data structures for each of the two or more processors based on a size of differences between the reference processor state and processor state of each of the two or more processors.

In Example 137, the method of Example 122, wherein allocating the data region in the cache comprises allocating the data region in the cache after a power-on reset and prior to performing memory detection. In Example 138, the method of Example 122, wherein allocating the data region in the cache comprises allocating the data region in the cache during a Pre-Extensible Firmware Interface (EFI) Initialization Environment (PEI), during a Driver Execution Environment, or during a System Management Mode (SMM). In Example 139, the method of Example 122, wherein allocating the data region in the cache comprises setting a memory range within the cache for the data region. In Example 140, the method of Example 139, further comprising storing a setting in a register to place the memory range in a no eviction mode. In Example 141, the method of Example 140, wherein modifying addresses in a register to associate a unique range of addresses with the data region in the second processor comprises assigning addresses to the data region in the second processor that are adjacent to the addresses assigned to the data region in the first processor. In Example 142, the method of Example 140, further comprising initializing a second set of two or more processors during a Driver Execution Environment (DXE) phase of platform initialization, wherein initializing the second set of two or more processors comprises compressing a data structure for one processor of the second set of two or more processors to be initialized during the DXE phase of platform initialization; and storing the data structure in memory, wherein compression of the data structure for the one processor of the second set of two or more processors comprises storing a reference data structure; determining a difference between the data structure for the one processor of the second set of two or more processors and the reference data structure; and storing the difference between the data structure for the one processor of the second set of two or more processors and the reference data structure in the memory. In Example 143, the method of Example 142, wherein compressing the data structure for the one or more cores comprises generating a linked list of one or more bits in the memory to indicate each non-zero difference between bits in the reference data structure and bits in the data structure for the second processor, wherein each entry in the linked list comprises an offset value to indicate a location within the data structure and a delta value to indicate one or more bits that are different from corresponding bits in the reference data structure.

In Example 144, the method of Example 122, wherein compressing the data structure for the one or more cores comprises generating a bitmap of one or more bits in the memory that indicates each non-zero difference between bits in the reference data structure and bits in the data structure for the second processor. In Example 145, the method of Example 122, further comprising synchronizing, by the first processor, global configuration data with the second processor. In Example 146, a computer readable medium having stored thereon instructions that when executed cause a computer to perform operations comprising the operations of any one of Examples 122-145. In Example 147, an apparatus to store data structures in cache to initialize processors, the system comprising a means for performing any one of Examples 122-145. In Example 148, a program for causing a computer to perform operations comprising operations of any one of Examples 122-145. In Example 149, a computer-readable storage medium for storing the program of Example 148.

Example 150 is a system to initialize computer processors in cache memory, the system comprising a memory comprising a dynamic random access memory; a first processor of two or more processors, coupled with the memory, the first processor comprising a memory logic configured to: allocate a data region in a cache to store the data structures for the two or more processors, wherein the cache is physically located in the first processor and in a second processor; store a first processor data structure for the first processor in the cache of the first processor; instruct the second processor to store a second processor data structure for the second processor in the cache of the second processor; and instruct the second processor to initialize the second processor with the second processor data structure stored in the cache of the second processor. In Example 151, the system of Example 150, wherein the memory logic comprises a code in the pre-operating system boot code to execute on a core of the first processor in a Pre-Extensible Firmware Interface (EFI) Initialization Environment (PEI) of platform initialization and a Driver Execution Environment (DXE) phase of platform initialization. In Example 152, the system of Example 150, wherein the memory logic comprises part of at least one of a Unified Extensible Firmware Interface (UEFI) firmware, a Basic Input Output System (BIOS) code, a Firmware Support Package code, a System Management Mode (SMM) code, other non-x86 pre-boot code, and other x86 pre-boot code. In Example 153, the system of Example 150, wherein the memory logic comprises address setting logic to modify addresses in one or more registers to associate a unique range of addresses with the data region in the second processor and address decoding logic to decode addresses to access the cache in the second processor. In Example 154, the system of Example 150, wherein the memory logic comprises data sync logic to synchronize global configuration data with the second processor. In Example 155, the system of Example 150, further comprising a system management random access memory (SMRAM), the memory logic to generate data structures for processor states for each of the two or more processors; to compress at least one of the data structures for processor states for at least one of the two or more processors; and to store the at least one of the data structures for the two or more processors in SMRAM, wherein compression of the data structures for processor states for at least one of the two or more processors comprises storage of a data structure for a reference processor state in the SMRAM; determination of a difference between a data structure for a second processor state for the second processor and the reference processor state; and storage of the difference between the data structure for a second processor state for the second processor and the data structure for the reference processor state in the SMRAM.

In Example 156, the system of Example 150, wherein a second set of two or more processors comprises one or more cores to be initialized during a Driver Execution Environment (DXE) phase of platform initialization, the memory logic is configured to compress a data structure for one processor of the second set of two or more processors to be initialized during the DXE phase of platform initialization; and to store the data structure in the memory, wherein compression of the data structure for one processor of the second set of two or more processors comprises storage of a reference data structure in the memory; determination of a difference between the data structure for one processor of the second set of two or more processors and the reference data structure; and storage of the difference between the data structure for the one processor of the second set of two or more processors and the reference data structure in the memory.

Example 157 is a non-transitory machine-readable medium containing instructions, which when executed by a first processor of two or more processors, cause the first processor to perform operations, the operations comprising: allocating, by the first processor of the two or more processors, a data region in a cache to store the data structures for the two or more processors, wherein the cache comprises a cache physically located in the first processor and a cache physically located in a second processor; instructing, by the first processor, the second processor to store a second processor data structure for the second processor in the cache of the second processor; and instructing, by the first processor, the second processor to initialize the second processor with the second processor data structure stored in the cache of the second processor. In Example 158, the machine-readable medium of Example 157, wherein the operations further comprise modifying, by the first processor, addresses in one or more registers to associate a unique range of addresses with the data region in the second processor; and decoding, by the first processor, addresses to access the cache in the second processor. In Example 159, the machine-readable medium of Example 157, wherein the operations further comprise storing, by the first processor, a data structure for a pointer comprising an address or address offset associated with the second processor data structure in the data region of the cache physically located in the first processor. In Example 160, the machine-readable medium of Example 157, wherein the operations further comprise generating data structures for processor states for each of the two or more processors; compressing the data structures for the processor states for at least one of the two or more processors; and storing at least one compressed processor state for the two or more processors in system management random access memory (SMRAM), wherein compressing the data structures for the processor states for at least one of the two or more processors comprises storing a data structure for a reference processor state in the SMRAM; determining a difference between a data structure for a second processor state for the second processor and the reference processor state; and storing the difference between the data structure for a second processor state for the second processor and the data structure for the reference processor state in the SMRAM.

In Example 161, the machine-readable medium of Example 157, wherein the operations further comprise selecting the reference processor state from a group of data structures for each of the two or more processors based on a size of differences between the reference processor state and processor state of each of the two or more processors. In Example 162, the machine-readable medium of Example 157, wherein the reference processor state comprises a data structure for the first processor. In Example 163, the machine-readable medium of Example 157, wherein allocating the data region in the cache comprises allocating the data region in the cache after a power-on reset and prior to performing memory detection. In Example 164, the machine-readable medium of Example 157, wherein allocating the data region in the cache comprises allocating the data region in the cache during a Pre-Extensible Firmware Interface (EFI) Initialization Environment (PEI), during a Driver Execution Environment, or during a System Management Mode (SMM). In Example 165, the machine-readable medium of Example 157, wherein allocating the data region in the cache comprises setting a memory range within the cache for the data region. In Example 166, the machine-readable medium of Example 165, wherein modifying addresses in a register to associate a unique range of addresses with the data region in the second processor comprises assigning addresses to the data region in the second processor that are adjacent to the addresses assigned to the data region in the first processor.

In Example 167, the machine-readable medium of Example 165, wherein the operations further comprise initializing a second set of two or more processors during a Driver Execution Environment (DXE) phase of platform initialization, wherein initializing the second set of two or more processors comprises compressing a data structure for one processor of the second set of two or more processors to be initialized during the DXE phase of platform initialization; and storing the data structure in the data region, wherein compression of the data structure for the one processor of the second set of two or more processors comprises storing a reference data structure; determining a difference between the data structure for the one processor of the set of two or more processors and the reference data structure; and storing the difference between the data structure for the one processor of the second set of two or more processors and the reference data structure in the memory. In Example 168, the machine-readable medium of Example 167, wherein compressing the data structure for the one processor of the second set of two or more processors comprises generating a linked list of one or more bits in the memory to indicate each non-zero difference between bits in the reference data structure and bits in the data structure for the one processor, wherein each entry in the linked list comprises an offset value to indicate a location within the data structure and a delta value to indicate one or more bits that are different from corresponding bits in the reference data structure. In Example 169, the machine-readable medium of Example 167, wherein compressing the data structure for the one processor of the second set of two or more processors comprises generating a bitmap of one or more bits in the memory that indicates each non-zero difference between bits in the reference data structure and bits in the data structure for the one processor. In Example 170, the machine-readable medium of Example 157, wherein the operations further comprise synchronizing, by the first processor, global configuration data with the second processor.

Example 171 is an apparatus to initialize computer processors in cache memory, the apparatus comprising a means for allocating, by a first processor of two or more processors, a data region in a cache to store the data structures for the two or more processors, wherein the cache comprises a cache physically located in the first processor and a cache physically located in a second processor; a means for instructing, by the first processor, the second processor to store a second processor data structure for the second processor in the cache of the second processor; and a means for instructing, by the first processor, the second processor to initialize the second processor with the second processor data structure stored in the cache of the second processor. In Example 172, the apparatus of Example 171, further comprising a means for modifying, by the first processor, addresses in one or more registers to associate a unique range of addresses with the data region in the second processor and a means for decoding, by the first processor, addresses to access the cache in the second processor. In Example 173, the apparatus of Example 172, wherein the means for modifying addresses in a register to associate a unique range of addresses with the data region in the second processor comprises a means for assigning addresses to the data region in the second processor that are adjacent to the addresses assigned to the data region in the first processor. In Example 174, the apparatus of Example 171, further comprising a means for storing, by the first processor, a data structure for a pointer comprising an address or address offset associated with the second processor data structure in the data region of the cache physically located in the first processor. In Example 175, the apparatus of Example 171, further comprising a means for generating data structures for processor states for each of the two or more processors; a means for compressing the data structures for the processor states for at least one of the two or more processors; and a means for storing at least one compressed processor state for the two or more processors in system management random access memory (SMRAM), wherein the means for compressing the data structures for the processor states for at least one of the two or more processors comprises a means for storing a data structure for a reference processor state in the SMRAM; a means for determining a difference between a data structure for a second processor state for the second processor and the reference processor state; and a means for storing the difference between the data structure for a second processor state for the second processor and the data structure for the reference processor state in the SMRAM. In Example 176, the apparatus of Example 173, further comprising a means for selecting the reference processor state from a group of data structures for each of the two or more processors based on a size of differences between the reference processor state and processor state of each of the two or more processors.

In Example 177, the apparatus of Example 171, wherein the reference processor state comprises a data structure for the first processor. In Example 178, the apparatus of Example 171, wherein the means for allocating the data region in the cache comprises a means for allocating the data region in the cache after a power-on reset and prior to performing memory detection. In Example 179, the apparatus of Example 171, wherein the means for allocating the data region in the cache comprises a means for allocating the data region in the cache during a Pre-Extensible Firmware Interface (EFI) Initialization Environment (PEI), during a Driver Execution Environment, or during a System Management Mode (SMM). In Example 180, the apparatus of Example 171, wherein the means for allocating the data region in the cache comprises a means for setting a memory range within the cache for the data region. In Example 181, the method of Example 179, further comprising a means for initializing one or more cores of a second set of two or more processors during a Driver Execution Environment (DXE) phase of platform initialization, wherein the means for initializing the one or more cores of the second set of two or more processors comprises a means for compressing a data structure for one processor of the second set of two or more processors to be initialized during the DXE phase of platform initialization; and a means for storing the data structure in memory, wherein the means for compressing the data structure for the one processor of the second set of two or more processors comprises a means for storing a reference data structure; a means for determining a difference between the data structure for the one processor of the second set of two or more processors and the reference data structure; and a means for storing the difference between the data structure for the one processor of the second set of two or more processors and the reference data structure in the memory.

In Example 182, the apparatus of Example 181, wherein the means for compressing the data structure for the one processor of the second set of two or more processors comprises a means for generating a linked list of one or more bits in the memory to indicate each non-zero difference between bits in the reference data structure and bits in the data structure for the one processor of the second set of two or more processors, wherein each entry in the linked list comprises an offset value to indicate a location within the data structure and a delta value to indicate one or more bits that are different from corresponding bits in the reference data structure. In Example 183, the apparatus of Example 181, wherein the means for compressing the data structure for the one or more cores comprises a means for generating a bitmap of one or more bits in the memory that indicates each non-zero difference between bits in the reference data structure and bits in the data structure for the second processor. In Example 184, the apparatus of Example 171, further comprising a means for synchronizing, by the first processor, global configuration data with the second processor.

What is claimed is:

1. A method to store computer processor data structures in computer memory, the method comprising:
    allocating, by a first processor of two or more processors, a data region in a memory to store the data structures for the two or more processors;
    determining, by the first processor, a reference data structure for at least one of the two or more processors, the reference data structure comprises power-up hardware default settings for at least one of the two or more processors;
    storing, by the first processor, the reference data structure in the data region;
    determining, by the first processor, a difference between the reference data structure and a data structure for a second processor of the two or more processors, wherein the difference includes a non-zero difference in bits between the reference data structure and the data structure of the second processor, the non-zero difference is compressed and stored in the data region; and
    storing, by the first processor, the difference between the reference data structure and the data structure for the second processor in the data region.

2. The method of claim 1, further comprising adding the reference data structure to the difference to decompress the data structure for the second processor and instructing the second processor to initialize based on the decompressed data structure for the second processor.

3. The method of claim 1, further comprising storing, by the first processor, a data structure for a pointer comprising an address associated with the reference data structure in the data region and storing a data structure for a pointer comprising an address associated with the difference between the reference data structure and the data structure for the second processor in the data region.

4. The method of claim 1, wherein allocating the data region in the memory comprises setting a memory range within a cache for the data region, allocating the data region in the cache of the first processor and allocating the data region in the cache of the second processor, and further comprising modifying addresses in a register to associate a unique range of addresses with the data region in the second processor.

5. The method of claim 1, wherein determining the difference between the reference data structure and the data structure for the second processor comprises compressing the data structure for the second processor by generating a compressed data structure comprising the difference.

6. The method of claim 5, wherein compressing the data structure for the second processor comprises generating a linked list of one or more bits in the data region to indicate each non-zero difference between bits in the reference data structure and bits in the data structure for the second processor, wherein each entry in the linked list comprises an offset value to indicate a location within the data structure and a delta value to indicate one or more bits that are different from corresponding bits in the reference data structure.

7. A method to initialize computer processors in a cache memory, the method comprising:
    allocating, by a first processor of two or more processors, a data region in a cache, wherein the data region of the cache stores data structures for the two or more processors, wherein the cache comprises a cache physically located in the first processor and a cache physically located in a second processor;
    instructing, by the first processor, the second processor to store a second processor data structure for the second processor in the cache of the second processor, wherein a difference between a first processor data structure for the first processor and the second processor data structure includes a non-zero difference in bits between the first processor data structure and the second processor data structure, the non-zero difference is compressed and stored in the data region; and
    instructing, by the first processor, the second processor to initialize the second processor with the second processor data structure stored in the cache of the second processor.

8. The method of claim 7, further comprising modifying, by the first processor, addresses in one or more registers to associate a unique range of addresses with the data region in the second processor and decoding, by the first processor, addresses to access the cache in the second processor.

9. The method of claim 7, further comprising storing, by the first processor, a data structure for a pointer comprising an address associated with the second processor data structure in the data region of the cache physically located in the first processor.

10. An apparatus to store computer processor data structures in a computer memory, the apparatus comprising:
    a first processor, of two or more processors, comprising at least one processor core and a cache to implement a memory logic, wherein the memory logic comprises a logic circuitry, the logic circuitry coupled with the processor core in the first processor,
    wherein the memory logic is configured to:
        allocate a data region in the memory to store the data structures for the two or more processors;
        determine a reference data structure for at least one of the two or more processors, the reference data structure comprises power-up hardware default settings for at least one of the two or more processors;
        store the reference data structure in the data region;
        determine a difference between the reference data structure and a data structure for a second processor of the two or more processors, wherein the difference includes a non-zero difference in bits between the reference data structure and the data structure of the second processor, the non-zero difference is compressed and stored in the data region; and
        store the difference between the reference data structure and the data structure for the second processor in the data region.

11. The apparatus of claim 10, wherein the memory logic is further configured to add the difference to the reference data structure to decompress the data structure for the second processor, to instruct the second processor to store the decompressed data structure for the second processor, and to instruct the second processor to initialize based on the decompressed data structure for the second processor.

12. The apparatus of claim 10, wherein the memory logic comprises a part of at least one of a Unified Extensible Firmware Interface (UEFI) firmware, a Basic Input Output System (BIOS) code, a Firmware Support Package code, a System Management Mode (SMM) code, other non-x86 pre-boot code, and other x86 pre-boot code.

13. The apparatus of claim 10, wherein the memory logic comprises code in a read only memory (ROM), the ROM coupled with the processor core in the first processor.

14. The apparatus of claim 10, wherein the data region resides at least in the cache of the first processor, wherein the cache is physically located in the first processor.

15. The apparatus of claim 10, wherein the memory logic is configured to store a data structure for a pointer comprising an address associated with the reference data structure in the data region and to store a data structure for a pointer comprising an address associated with the difference between the reference data structure and the data structure for the second processor in the data region.

16. The apparatus of claim 10, further comprising a dynamic random access memory coupled with the two or more processors.

17. The apparatus of claim 10, wherein the memory logic comprises code stored on a computer readable medium.

18. An apparatus to initialize computer processors in a cache memory, the apparatus comprising:
 a first processor of two or more processors, the first processor comprising a memory logic, at least a portion of the memory logic comprising logic circuitry of the first processor, the memory logic configured to:
 allocate a data region in a cache to store data structures for the two or more processors, wherein the cache is physically located in the first processor and in a second processor;
 store a first processor data structure for the first processor in the cache of the first processor, the first processor data structure comprises power-up hardware default settings for at least one of the two or more processors;
 instruct the second processor to store a second processor data structure for the second processor in the cache of the second processor, wherein the second processor data structure is based on the first processor data structure, and wherein a difference between the first processor data structure and the second processor data structure includes a non-zero difference in bits between the first processor data structure and the second processor data structure, the non-zero difference is compressed and stored in the data region; and
 instruct the second processor to initialize the second processor with the second processor data structure stored in the cache of the second processor.

19. The apparatus of claim 18, wherein the memory logic comprises a data sync logic to synchronize global configuration data with the second processor.

20. The apparatus of claim 18, wherein the memory logic comprises an address setting logic to modify addresses in one or more registers to associate a unique range of addresses with the data region in the second processor and an address decoding logic to decode addresses to access the cache in the second processor.

21. The apparatus of claim 18, further comprising a system management random access memory (SMRAM), the memory logic to generate data structures for processor states for each of the two or more processors; to compress at least one of the data structures for the processor states for at least one of the two or more processors; and to store the at least one of the data structures for the two or more processors in the SMRAM, wherein the compression of the data structures for processor states for at least one of the two or more processors comprises storage of a data structure for a reference processor state in the SMRAM; determination of a difference between a data structure for a second processor state for the second processor and the reference processor state; and storage of the difference between the data structure for the second processor state for the second processor and the data structure for the reference processor state in the SMRAM.

22. The apparatus of claim 18, further comprising a second set of two or more processors to be initialized during a pre-initialization environment (PEI) phase or a Driver Execution Environment (DXE) phase of platform initialization, the memory logic being configured to compress a data structure for one processor of the second set of two or more processors; and to store the data structure in memory, wherein the compression of the data structure for the one processor of the second set of two or more processors comprises storage of a reference data structure in the data region; determination of a difference between the data structure for the second set of two or more processors and the reference data structure; and storage of the difference between the data structure for the second set of two or more processors and the reference data structure in the data region.

23. The apparatus of claim 18, further comprising a dynamic random access memory coupled with the two or more processors.

24. The apparatus of claim 18, wherein a portion of the memory logic comprises code stored on a computer readable medium.

\* \* \* \* \*